US011553393B2

(12) United States Patent
Chen et al.

(10) Patent No.: US 11,553,393 B2
(45) Date of Patent: Jan. 10, 2023

(54) TRANSMISSION CONTROL METHOD AND DEVICE

(71) Applicant: Huawei Technologies Co., Ltd., Shenzhen (CN)

(72) Inventors: Jian Chen, Shanghai (CN); Jun Yang, Shenzhen (CN); Bingjian Du, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 18 days.

(21) Appl. No.: 17/251,551

(22) PCT Filed: Jun. 13, 2018

(86) PCT No.: PCT/CN2018/091149
§ 371 (c)(1),
(2) Date: Dec. 11, 2020

(87) PCT Pub. No.: WO2019/237291
PCT Pub. Date: Dec. 19, 2019

(65) Prior Publication Data
US 2021/0250836 A1     Aug. 12, 2021

(51) Int. Cl.
*H04W 36/30* (2009.01)
*H04W 76/19* (2018.01)
(Continued)

(52) U.S. Cl.
CPC ..... *H04W 36/305* (2018.08); *H04W 36/0077* (2013.01); *H04W 76/19* (2018.02); *H04W 84/12* (2013.01)

(58) Field of Classification Search
None
See application file for complete search history.

(56) References Cited

U.S. PATENT DOCUMENTS

2011/0242969 A1   10/2011   Dayal et al.
2014/0269512 A1    9/2014   Koo
(Continued)

FOREIGN PATENT DOCUMENTS

CN     101626317 A     1/2010
CN     102315864 A     1/2012
(Continued)

OTHER PUBLICATIONS

"Part 11: Wireless LAN Medium Access Control (MAC) and Physical Layer (PHY) Specifications," IEEE P802.11-REVmcTM/D8.0, Aug. 2016, 3774 pages.

*Primary Examiner* — Kenny S Lin
(74) *Attorney, Agent, or Firm* — Conley Rose, P.C.

(57) ABSTRACT

A transmission control method includes sending or receiving, by a first device, first data to or from a second device through a first communication connection, detecting, by the first device when sending or receiving the first data to or from the second device through the first communication connection, that an error has occurred on the first communication connection, and sending, by the first device, error information of the first communication connection to the second device through a second communication connection, where the second communication connection is different from the first communication connection, and the error information indicates that the error has occurred on the first communication connection.

20 Claims, 21 Drawing Sheets

(51) Int. Cl.
*H04W 36/00* (2009.01)
*H04W 84/12* (2009.01)

(56) References Cited

U.S. PATENT DOCUMENTS

| | | |
|---|---|---|
| 2014/0310381 A1 | 10/2014 | Koo |
| 2015/0208287 A1 | 7/2015 | Sylvain |
| 2015/0230283 A1 | 8/2015 | Li et al. |
| 2015/0271702 A1* | 9/2015 | Jang ............... H04W 28/04 370/216 |
| 2016/0066205 A1* | 3/2016 | Hara ............... H04W 48/16 370/252 |
| 2016/0174233 A1 | 6/2016 | Emmanuel et al. |
| 2016/0205076 A1* | 7/2016 | Shimizu ........... H04W 48/18 380/255 |
| 2016/0337821 A1 | 11/2016 | Kawakami et al. |
| 2018/0049091 A1 | 2/2018 | Wang |
| 2018/0098233 A1* | 4/2018 | Talari ............... H04L 41/16 |
| 2019/0052476 A1 | 2/2019 | Shu et al. |
| 2019/0141614 A1 | 5/2019 | Wang et al. |
| 2020/0169451 A1* | 5/2020 | Sprenger ............ H04L 41/5009 |

FOREIGN PATENT DOCUMENTS

| | | |
|---|---|---|
| CN | 102804910 A | 11/2012 |
| CN | 104730366 A | 6/2015 |
| CN | 205072837 U | 3/2016 |
| CN | 205430248 U | 8/2016 |
| CN | 105992288 A | 10/2016 |
| CN | 106571989 A | 4/2017 |
| CN | 106996004 A | 8/2017 |
| CN | 107018554 A | 8/2017 |
| CN | 107105516 A | 8/2017 |
| CN | 107249174 A | 10/2017 |
| CN | 107371219 A | 11/2017 |
| CN | 107567109 A | 1/2018 |
| CN | 107948959 A | 4/2018 |
| WO | 2013100483 A1 | 7/2013 |
| WO | 2013122325 A1 | 8/2013 |
| WO | 2016127138 A1 | 8/2016 |
| WO | 2017039736 A1 | 3/2017 |

* cited by examiner

TRANSMISSION CONTROL METHOD AND DEVICE

CROSS-REFERENCE TO RELATED APPLICATIONS

This application is a U.S. National Stage of International Patent Application No. PCT/CN2018/091149 filed on Jun. 13, 2018, which is hereby incorporated by reference in its entirety.

TECHNICAL FIELD

Embodiments of this application relate to the field of communications technologies, and in particular, to a transmission control method and a device.

BACKGROUND

Wireless local area network (WLAN) technologies enable a user to conveniently access a network resource wirelessly anytime and anywhere. WI-FI is widely applied as a WLAN technology. After being connected to a WI-FI hotspot, a device may transmit data through a WI-FI network provided by the WI-FI hotspot.

However, in a process in which the device establishes a Wi-Fi connection to the Wi-Fi hotspot, if an error occurs on the Wi-Fi connection, the device can be reconnected to the Wi-Fi hotspot in response to a user's operation only after an error prompt is displayed. If the error occurs on the Wi-Fi connection, the device can re-establish the Wi-Fi connection only after the user's operation. Consequently, efficiency of establishing the Wi-Fi connection by the device is relatively low.

In addition, in a process in which the device transmits a file through the Wi-Fi network, an error that occurs on a Wi-Fi connection of either transmission party can cause a file transmission error. In this case, the other party cannot sense the file transmission error in time, and devices of both parties can re-establish the Wi-Fi connection to each other only after a user's operation, to continue to transmit the file.

SUMMARY

Embodiments of this application provide a transmission control method and a device, so that devices of both parties can detect, in time, that an error occurs on a Wi-Fi connection, and perform error tolerance processing in time.

According to a first aspect, an embodiment of this application provides a transmission control method. The transmission control method includes: sending/receiving, by a first device, first data to/from a second device through a first communication connection; in a process in which the first device sends/receives the first data to/from the second device through the first communication connection, detecting, by the first device, that an error occurs on the first communication connection; and sending, by the first device, error information of the first communication connection to the second device through a second communication connection, where the second communication connection is different from the first communication connection, and the error information is used to indicate that the error occurs on the first communication connection.

The first device may send the error information of the first communication connection to the second device through the second communication connection after detecting that the error occurs on the first communication connection. The first device sends the error information of the first communication connection to the second device in time, so that the second device can sense in time that the error occurs on the first communication connection. In this way, the first device and the second device can perform error tolerance processing in time.

With reference to the first aspect, in a possible design manner, after sending the error information of the first communication connection to the second device through the second communication connection, the first device may exchange a connection parameter of the first communication connection with the second device through the second communication connection. In this case, the first device may directly re-establish the first communication connection to the second device based on the connection parameter, instead of performing error correction processing on the first communication connection, then exchanging the connection parameter of the first communication connection according to a general procedure corresponding to the first communication connection, and finally re-establishing the first communication connection based on the connection parameter. In this way, a time for establishing the first communication connection can be shortened, and efficiency of establishing the first communication connection can be improved.

With reference to the first aspect, in another possible design manner, the error information may further include first breakpoint information of the first data. The first breakpoint information is used to indicate an end location at which data in the first data has been correctly sent/received by the first device to/from the second device.

With reference to the first aspect, in another possible design manner, after re-establishing the first communication connection based on the connection parameter of the first communication connection, the first device may send/receive the first data to/from the second device through the first communication connection based on the first breakpoint information.

With reference to the first aspect, in another possible design manner, after the first device sends the error information of the first communication connection to the second device through the second communication connection, the first device may send/receive the first data to/from the second device through the second communication connection based on the first breakpoint information. After the error occurs on the first communication connection, the first device directly continues to send/receive the first data to/from the second device through the second communication connection, instead of sending/receiving the first data to/from the second device through the re-established first communication connection after the first communication connection is re-established. In this way, sending/receiving the first data can be quickly completed, and efficiency of sending/receiving the first data can be improved.

For example, the first communication connection is a Wi-Fi connection, and the second communication connection is a Bluetooth connection. It may be understood that, when the first device has established the Bluetooth connection to the second device, because it is necessary to take the first device some time to re-establish the Wi-Fi connection to the second device, the first device sends/receives the first data to/from the second device through the Bluetooth connection. In this way, sending/receiving the first data can be quickly completed, and efficiency of sending/receiving the first data can be improved. When the first device has not established the Bluetooth connection to the second device, because it is necessary to take the first device some time to re-establish the Wi-Fi connection to the second device, and a time required for establishing the Bluetooth connection is shorter than the time required for establishing the Wi-Fi connection, the first device sends/receives the first data to/from the second device through the Bluetooth connection. In this way, sending/receiving the first data can be quickly completed, and efficiency of sending/receiving the first data can be improved.

It may be understood that, after the error occurs on the first communication connection, the first device may directly send/receive the first data to/from the second device through the second communication connection. In other words, an operation 2 is performed between the first device and the second device: sending/receiving the first data to/from the second device through the second communication connection. Alternatively, after the error occurs on the first communication connection, the first device may wait until the first communication connection is successfully re-established, and send/receive the first data to/from the second device through the re-established first communication connection. In other words, an operation 1 is performed between the first device and the second device: re-establishing the first communication connection, and sending/receiving the first data to/from the second device through the re-established first communication connection.

With reference to the first aspect, in another possible design manner, a user may select the "operation 1" or the "operation 2" to be performed between the first device and the second device. The sending/receiving, by the first device, the first data to/from the second device through the second communication connection based on the first breakpoint information may include: displaying, by the first device, a second screen including first confirmation information. The first confirmation information is used to indicate that the error occurs on the first communication connection, and request the user to determine to perform the operation 1 or the operation 2. In response to user' selection of the operation 2, the first device may send/receive the first data to/from the second device through the second communication connection based on the first breakpoint information. In response to user's selection of the operation 1, after establishing the first communication connection, the first device may send/receive the first data to/from the second device through the first communication connection based on the first breakpoint information.

With reference to the first aspect, in another possible design manner, considering that a transmission rate through the first communication connection may be higher than a transmission rate through the second communication connection, after successfully establishing the first communication connection, the first device may continue to send/receive the first data to/from the second device through the first communication connection. The first device re-establishes the first communication connection to the second device based on the connection parameter of the first communication connection. After the first device successfully re-establishes the first communication connection, if sending/receiving the first data is not completed, the first device may stop sending/receiving the first data to/from the second device through the second communication connection, and send/receive the first data to/from the second device through the first communication connection based on second breakpoint information of the first data. The second breakpoint information is used to indicate an end location at which data in the first data has been correctly sent/received by the first device to/from the second device through the second communication connection.

Optionally, after the first device successfully establishes the first communication connection, if sending/receiving the first data is not completed, the first device may determine whether the transmission rate through the first communication connection is higher than the transmission rate through the second communication connection. When the transmission rate through the first communication connection is higher than the transmission rate through the second communication connection, the first device may stop sending/receiving the first data to/from the second device through the second communication connection, and continue to send/receive the first data to/from the second device through the first communication connection based on the second breakpoint information of the first data.

Optionally, after the first device successfully establishes the first communication connection, if sending/receiving the first data is not completed, the terminal may determine whether an amount of data that is in the first data and that has not been sent/received is greater than a preset data amount threshold. When the amount of data that has not been sent/received is greater than the preset data amount threshold, the terminal may stop sending/receiving the first data through the second communication connection, and continue to send/receive the first data through the first communication connection. When the amount of data that has not been sent/received is less than or equal to the preset data amount threshold, the terminal may continue sending/receiving the first data through the second communication connection.

With reference to the first aspect, in another possible design manner, to improve performance of interaction between the device and the user, after the first communication connection is successfully re-established, if sending/receiving the first data is not completed, the user may select whether to continue to send/receive the first data through the re-established first communication connection. Specifically, after the first device successfully establishes the first communication connection, if sending/receiving the first data is not completed, the first device may display a fourth screen including second confirmation information. The second confirmation information is used to indicate that the first communication connection is successfully established, and request the user to determine whether to continue to send/receive the first data through the re-established first communication connection. In response to user's selection of continuing to send/receive the first data through the re-established first communication connection, the first device may stop sending/receiving the first data to/from the second device through the second communication connection, and send/receive the first data to/from the second device through the first communication connection based on the second breakpoint information of the first data.

According to a second aspect, an embodiment of this application provides a transmission control method. The transmission control method includes: in a process in which a first device establishes a first communication connection to a second device, detecting, by the first device, that an error occurs on the first communication connection; sending, by the first device, error information of the first communication connection to the second device through a second communication connection, where the second communication connection is different from the first communication connection, and the error information is used to indicate that the error occurs on the first communication connection; exchanging, by the first device, a connection parameter of the first communication connection with the second device through the second communication connection; and establishing, by the first device, the first communication connection to the second device based on the connection parameter of the first communication connection.

In this embodiment of this application, the first device may send the error information of the first communication connection to the second device through the second communication connection after detecting that the error occurs on the first communication connection. The first device sends the error information of the first communication connection to the second device in time, so that the second device can sense in time that the error occurs on the first communication connection. In addition, after the error occurs on the first communication connection, the first device may exchange the connection parameter of the first communication connection with the second device through the second communication connection, and then directly re-establish the first communication connection to the second device based on the connection parameter. In this way, a time for establishing the first communication connection can be shortened, and efficiency of establishing the first communication connection can be improved.

With reference to the first aspect or the second aspect, in another possible design manner, functions of the second communication connection on the first device and the second device are both enabled, and the first device establishes the second communication connection to the second device. In this case, when detecting that the error occurs on the first communication connection, the first device may directly send the error information to the second device through the second communication connection between the first device and the second device.

With reference to the first aspect or the second aspect, in another possible design manner, a function of the second communication connection on the second device is enabled. Before the first device sends the error information to the second device through the second communication connection, a function of the second communication connection on the first device is enabled. However, the first device has not established the second communication connection to the second device. In this case, in response to detection of the error that occurs on the first communication connection, the first device may establish the second communication connection to the second device.

With reference to the first aspect or the second aspect, in another possible design manner, a function of the second communication connection (for example, a Bluetooth connection) on the second device is enabled, and a function of the second communication connection on the first device is disabled. In this case, in response to detection of the error that occurs on the first communication connection, the first device may enable the function of the second communication connection on the first device, and establish the second communication connection to the second device.

With reference to the first aspect or the second aspect, in another possible design manner, there is a communication connection between the first device and the second device other than the first communication connection. In this case, in response to detection of the error that occurs on the first communication connection, the first device may determine that the another communication connection is the second communication connection, and then send the error information of the first communication connection to the second device through the second communication connection.

Optionally, before sending the error information to the second device through the Bluetooth connection, the first device may provide first prompt information. The first prompt information is used to indicate that the error occurs on the first communication connection, and request a user to determine to send the error information to the second device through the Bluetooth connection. A manner for providing the first prompt information by the first device may include: displaying, by the first device, a screen including the first prompt information; or playing, by the first terminal, the first prompt information through a voice prompt.

With reference to the first aspect or the second aspect, in another possible design manner, there are a plurality of communication connections other than the first communication connection between the first device and the second device. In this case, in response to detection of the error that occurs on the first communication connection, the first device may select, from the plurality of communication connections, a communication connection through which power consumption is relatively low or a transmission rate is relatively high as the second communication connection, and then send the error information of the first communication connection to the second device through the second communication connection.

With reference to the first aspect or the second aspect, in another possible design manner, there are a plurality of communication connections other than the first communication connection between the first device and the second device. In this case, the first device may display a first screen in response to detection of the error that occurs on the first communication connection. The first screen includes options for the plurality of communication connections. In response to a user's selection operation on the options for the plurality of communication connections, the first device uses a communication connection selected by the user as the second communication connection. In other words, when there are a plurality of communication connections between the first device and the second device, the user may select the second communication connection from the plurality of communication connections. In this way, performance of interaction between the device and the user can be improved.

Optionally, the first screen further includes second prompt information. The second prompt information is used to indicate that the error occurs on the first communication connection, and indicate a user to select one communication connection from at least two communication connections.

With reference to the first aspect or the second aspect, in another possible design manner, the first device may display a third screen in response to detection of the error that occurs on the first communication connection. The third screen includes options for a plurality of communication connections. The plurality of communication connections include communication connections that can be established between the first device and the second device. In response to a user's selection operation on the options for the plurality of communication connections, the first device determines a communication connection corresponding to an option selected by the user as the second communication connection, and establishes the second communication connection to the second device.

In this embodiment of this application, the communication connections that can be established between the first device and the second device may include a communication connection that has been established between the first device and the second device and a communication connection that has not been established between the first device and the second device. Although the communication connection has not been established between the first device and the second device, a condition for establishing the communication connection between the first device and the second device is satisfied. For example, it is assumed that a USB connection has been established between the first device and the second device currently. Although a Bluetooth connection has not been established between the first device and the second device, Bluetooth on the first device and Bluetooth on the second device are both enabled, and a condition for establishing the Bluetooth connection between the first device and the second device is satisfied. Therefore, the communication connections that can be established between the first device and the second device include the Bluetooth connection and the USB connection.

With reference to the first aspect or the second aspect, in another possible design manner, the first communication connection is a Wi-Fi connection, and the second communication connection is a Bluetooth connection. Certainly, the communication connections in this embodiment of this application include but are not limited to the Wi-Fi connection and the Bluetooth connection. Details are not described in this embodiment of this application.

According to a third aspect, an embodiment of this application provides a device. The device is a first device, and the device includes a first communications unit, a detection unit, and a second communications unit. The first communications unit is configured to send/receive first data to/from a second device through a first communication connection. The detection unit is configured to: in a process in which the first communications unit sends/receives the first data to/from the second device through the first communication connection, detect that an error occurs on the first communication connection. The second communications unit is configured to send error information of the first communication connection to the second device through a second communication connection. The second communication connection is different from the first communication connection, and the error information is used to indicate that the error occurs on the first communication connection.

With reference to the third aspect, in a possible design manner, the second communications unit is further configured to: after sending the error information of the first communication connection to the second device through the second communication connection, exchange a connection parameter of the first communication connection with the second device through the second communication connection. The device further includes an establishment unit, configured to establish the first communication connection to the second device based on the connection parameter that is of the first communication connection and that is obtained by the second communications unit.

With reference to the third aspect, in another possible design manner, the error information further includes first breakpoint information of the first data, and the first breakpoint information is used to indicate an end location at which data in the first data has been correctly sent/received by the first device to/from the second device. The second communications unit is further configured to: after sending the error information of the first communication connection to the second device through the second communication connection, send/receive the first data to/from the second device through the second communication connection based on the first breakpoint information.

With reference to the third aspect, in another possible design manner, the error information further includes first breakpoint information of the first data, and the first breakpoint information is used to indicate an end location at which data in the first data has been correctly sent/received by the first device to/from the second device. The first communications unit is further configured to: after the establishment unit establishes the first communication connection, send/receive the first data to/from the second device through the first communication connection based on the first breakpoint information.

With reference to the third aspect, in another possible design manner, the device further includes a control unit. The control unit is configured to: after the establishment unit establishes the first communication connection, if sending/receiving the first data is not completed, control the second communications unit to stop sending/receiving the first data to/from the second device through the second communication connection. The first communications unit is configured to send/receive the first data through the first communication connection based on second breakpoint information of the first data. The second breakpoint information is used to indicate an end location at which data in the first data has been correctly sent/received by the first device to/from the second device through the second communication connection.

With reference to the third aspect, in another possible design manner, the control unit is specifically configured to: if sending/receiving the first data is not completed, and an amount of data that has not been sent/received is greater than a preset data amount threshold, control the second communications unit to stop sending/receiving the first data to/from the second device through the second communication connection, and send/receive the first data to/from the second device through the first communication connection based on the second breakpoint information.

With reference to the third aspect, in another possible design manner, the device further includes a selection unit. The selection unit is configured to: before the second communications unit sends the error information of the first communication connection to the second device through the second communication connection, select the second communication connection from one or more communication connections in response to detection of the error that occurs on the first communication connection. The second communication connection is a communication connection that is in the one or more communication connections and through which power consumption is lowest and/or a transmission rate is highest. The one or more communication connections include all other communication connections than the first communication connection that have been established between the first device and the second device.

With reference to the third aspect, in another possible design manner, the device further includes a prompting unit. The prompting unit is configured to provide first prompt information after the selection unit selects the second communication connection from the one or more communication connections and before the second communications unit sends the error information of the first communication connection to the second device through the second communication connection. The first prompt information is used to indicate that the error occurs on the first connection, and request a user to determine whether to send the error information to the second device through the second communication connection.

With reference to the third aspect, in another possible design manner, the device further includes a display unit and a determining unit. The display unit is configured to: before the second communications unit sends the error information of the first communication connection to the second device through the second communication connection, display a first screen in response to detection of the error that occurs on the first communication connection. The first screen includes one or more options for the one or more communication connections, and the one or more communication connections include all other communication connections than the first communication connection that have been established between the first device and the second device. The determining unit is configured to: in response to a user's selection operation on the one or more options for the one or more communication connections, determine a communication connection corresponding to an option selected by the user as the second communication connection.

With reference to the third aspect, in another possible design manner, the first screen displayed by the display unit further includes second prompt information, and the second prompt information is used to indicate that the error occurs on the first communication connection, and indicate the user to select one communication connection from at least two communication connections.

With reference to the third aspect, in another possible design manner, the establishment unit is further configured to: before the second communications unit sends the error information of the first communication connection to the second device through the second communication connection, establish the second communication connection to the second device in response to detection of the error that occurs on the first communication connection.

With reference to the third aspect, in another possible design manner, the display unit is configured to display a third screen in response to detection of the error that occurs on the first communication connection. The third screen includes options for a plurality of communication connections, and the plurality of communication connections include communication connections that can be established between the first device and the second device.

The establishment unit and the establishment unit are respectively further configured to: in response to a user's selection operation on the options for the plurality of communication connections displayed by the display unit, determine a communication connection corresponding to an option selected by the user as the second communication connection, and establish the second communication connection to the second device.

With reference to the third aspect, in another possible design manner, the display unit is configured to display a second screen. The second screen includes first confirmation information, and the first confirmation information is used to indicate that the error occurs on the first communication connection, and request the user to determine to perform the following operation 1 or operation 2. The operation 1 is re-establishing the first communication connection, and sending/receiving the first data through the re-established first communication connection. The operation 2 is sending/receiving the first data through the second communication connection. The second communications unit is further configured to: in response to user's selection of the operation 2 displayed by the display unit, send/receive the first data to/from the second device through the second communication connection based on the first breakpoint information.

With reference to the third aspect, in another possible design manner, the first communications unit is further configured to: in response to user's selection of the operation 1 displayed by the display unit, after the establishment unit establishes the first communication connection, send/receive the first data to/from the second device through the first communication connection based on the first breakpoint information.

With reference to the third aspect, in another possible design manner, the display unit is configured to: after the establishment unit successfully establishes the first communication connection, display a fourth screen if sending/receiving the first data is not completed. The fourth screen includes second confirmation information, and the second confirmation information is used to indicate that the first communication connection is successfully established, and request the user to determine whether to continue to send/receive the first data through the re-established first communication connection. The control unit is specifically configured to: in response to user's selection of continuing to send/receive the first data through the re-established first communication connection, stop sending/receiving the first data to/from the second device through the second communication connection.

With reference to the third aspect, in another possible design manner, the first communication connection is a Wi-Fi connection, and the second communication connection is a Bluetooth connection.

According to a fourth aspect, an embodiment of this application provides a device. The device is a first device, and the device includes a processor, a memory, a first communications interface, and a second communications interface. The first communications interface, the second communications interface, and the memory are coupled to the processor. The first communications interface is configured to send/receive data through a first communication connection, and the second communications interface is configured to send and receive data through a second communication connection. The second communication connection is different from the first communication connection. The memory includes a nonvolatile storage medium, the memory is configured to store computer program code, and the computer program code includes a computer instruction. When the processor executes the computer instruction, the first communications interface is configured to send/receive first data through the first communication connection; the processor is configured to: in a process in which the first communications interface sends/receives the first data to/from a second device through the first communication connection, detect that an error occurs on the first communication connection; and the second communications interface is configured to send error information of the first communication connection to the second device through the second communication connection, where the error information is used to indicate that the error occurs on the first communication connection.

With reference to the fourth aspect, in a possible design manner, the second communications interface is further configured to: after sending the error information of the first communication connection to the second device through the second communication connection, exchange a connection parameter of the first communication connection with the second device through the second communication connection. The processor is further configured to establish the first communication connection to the second device based on the connection parameter of the first communication connection.

With reference to the fourth aspect, in another possible design manner, the error information further includes first breakpoint information of the first data, and the first breakpoint information is used to indicate an end location at which data in the first data has been correctly sent/received by the first device to/from the second device. The second communications interface is further configured to: after sending the error information of the first communication connection to the second device through the second communication connection, send/receive the first data to/from the second device through the second communication connection based on the first breakpoint information.

With reference to the fourth aspect, in another possible design manner, the error information further includes first breakpoint information of the first data, and the first breakpoint information is used to indicate an end location at which data in the first data has been correctly sent/received by the first device to/from the second device. The first communications interface is further configured to: after the processor establishes the first communication connection to the second device based on the connection parameter of the first communication connection, send/receive the first data to/from the second device through the first communication connection based on the first breakpoint information.

With reference to the fourth aspect, in another possible design, the processor is further configured to: after the first communication connection is successfully established, if sending/receiving the first data is not completed, control the second communications interface to stop sending/receiving the first data to/from the second device through the second communication connection. The first communications interface is further configured to send/receive the first data to/from the second device through the first communication connection based on second breakpoint information of the first data. The second breakpoint information is used to indicate an end location at which data in the first data has been correctly sent/received by the first device to/from the second device through the second communication connection.

With reference to the fourth aspect, in another possible design manner, that the processor is configured to: if sending/receiving the first data is not completed, control the second communications interface to stop sending/receiving the first data to/from the second device through the second communication connection includes: The processor is configured to: if sending/receiving the first data is not completed, and an amount of data that has not been sent/received is greater than a preset data amount threshold, control the second communications interface to stop sending/receiving the first data to/from the second device through the second communication connection.

With reference to the fourth aspect, in another possible design manner, the processor is further configured to: before the second communications interface sends the error information of the first communication connection to the second device through the second communication connection, select the second communication connection from one or more communication connections in response to detection of the error that occurs on the first communication connection. The second communication connection is a communication connection that is in the one or more communication connections and through which power consumption is lowest and/or a transmission rate is highest. The one or more communication connections include all other communication connections than the first communication connection that have been established between the first device and the second device.

With reference to the fourth aspect, in another possible design manner, the processor is further configured to provide first prompt information after the processor selects the second communication connection from the one or more communication connections and before the second communications interface sends the error information of the first communication connection to the second device through the second communication connection. The first prompt information is used to indicate that the error occurs on the first connection, and request a user to determine whether to send the error information to the second device through the second communication connection.

With reference to the fourth aspect, in another possible design manner, the device further includes a display. The display is configured to: before the second communications interface sends the error information of the first communication connection to the second device through the second communication connection, display a first screen in response to detection of the error that occurs on the first communication connection. The first screen includes one or more options for the one or more communication connections, and the one or more communication connections include all other communication connections than the first communication connection that have been established between the first device and the second device. The processor is further configured to: in response to a user's selection operation on the one or more options for the one or more communication connections, determine a communication connection corresponding to an option selected by the user as the second communication connection.

With reference to the fourth aspect, in another possible design manner, the first screen displayed by the display further includes second prompt information, and the second prompt information is used to indicate that the error occurs on the first communication connection, and indicate the user to select one communication connection from at least two communication connections.

With reference to the fourth aspect, in another possible design manner, the processor is further configured to: before the second communications interface sends the error information of the first communication connection to the second device through the second communication connection, establish the second communication connection to the second device in response to detection of the error that occurs on the first communication connection.

With reference to the fourth aspect, in another possible design manner, the display is further configured to display a third screen in response to detection of the error that occurs on the first communication connection. The third screen includes options for a plurality of communication connections, and the plurality of communication connections include communication connections that can be established between the first device and the second device. The processor is further configured to: in response to a user's selection operation on the options for the plurality of communication connections, determine a communication connection corresponding to an option selected by the user as the second communication connection, and establish the second communication connection to the second device.

With reference to the fourth aspect, in another possible design manner, the display is configured to display a second screen. The second screen includes first confirmation information, and the first confirmation information is used to indicate that the error occurs on the first communication connection, and request the user to determine to perform the following operation 1 or operation 2. The operation 1 is re-establishing the first communication connection, and sending/receiving the first data through the re-established first communication connection. The operation 2 is sending/receiving the first data through the second communication connection. The second communications interface is further configured to: in response to user's selection of the operation 2, send/receive the first data to/from the second device through the second communication connection based on the first breakpoint information.

With reference to the fourth aspect, in another possible design manner, the first communications interface is further configured to: in response to user's selection of the operation 1, after the processor establishes the first communication connection, send/receive the first data to/from the second device through the first communication connection based on the first breakpoint information.

With reference to the fourth aspect, in another possible design manner, the display is configured to: after the processor successfully establishes the first communication connection, display a fourth screen if sending/receiving the first data is not completed. The fourth screen includes second confirmation information, and the second confirmation information is used to indicate that the first communication connection is successfully established, and request the user to determine whether to continue to send/receive the first data through the re-established first communication connection. The processor is further configured to: in response to users selection of continuing to send/receive the first data through the re-established first communication connection, control the second communications interface to stop sending/receiving the first data to/from the second device through the second communication connection. The first communications interface is further configured to send/receive the first data through the first communication connection based on the second breakpoint information of the first data.

According to a fifth aspect, an embodiment of this application provides a computer storage medium. The computer storage medium includes a computer instruction. When the computer instruction is run on a device, the device is enabled to perform the transmission control method in any one of the first aspect or the possible design manners of the first aspect, or the transmission control method in any one of the second aspect or the possible design manners of the second aspect.

According to a sixth aspect, an embodiment of this application provides a computer program product. When the computer program product is run on a computer, the computer is enabled to perform the transmission control method in any one of the first aspect or the possible design manners of the first aspect, or the transmission control method in any one of the second aspect or the possible design manners of the second aspect.

In addition, for technical effects brought by the second aspect to the fourth aspect and any design manner of the second aspect to the fourth aspect and technical effects brought by the fifth aspect and the sixth aspect, refer to the technical effects brought by the first aspect and different design manners of the first aspect. Details are not described in this embodiment of this application again.

DESCRIPTION OF EMBODIMENTS

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the description of the embodiments of this application, unless otherwise stated, "a plurality of" means two or more than two.

An embodiment of this application provides a transmission control method. The method may be applied to a device. Specifically, the method may be applied to a process in which the device establishes a first communication connection and sends/receives data through the first communication connection. According to the method provided in this embodiment of this application, after an error occurs on the first communication connection, the device may feed back error information to a peer device through a second communication connection, so that the peer device can perform corresponding processing based on the error information. Therefore, the device and the peer device can detect, in time, that an error occurs on a Wi-Fi connection, and perform error tolerance processing in time.

The first communication connection in this embodiment of this application may include any one of a WI-FI connection, a BLUETOOTH connection, a Universal Serial Bus (USB) connection, an ultra-wideband (UWB) connection, a ZIGBEE connection, and a Near-Field-Communication (NFC) connection. The second communication connection may include any one of a BLUETOOTH connection, a USB connection, a UWB connection, a ZIGBEE connection, and an NFC connection.

It should be noted that the first communication connection is different from the second communication connection in this embodiment of this application. For example, when the first communication connection is a WI-FI connection, the second communication connection may be any one of a BLUETOOTH connection, a USB connection, a UWB connection, a ZIGBEE connection, and an NFC connection. When the first communication connection is a BLUETOOTH connection, the second communication connection may be any one of a USB connection, a UWB connection, a ZIGBEE connection, and an NFC connection. In this embodiment of this application, the BLUETOOTH connection may be a conventional BLUETOOTH connection or a BLUETOOTH low energy (BLE) connection.

Figure 1:
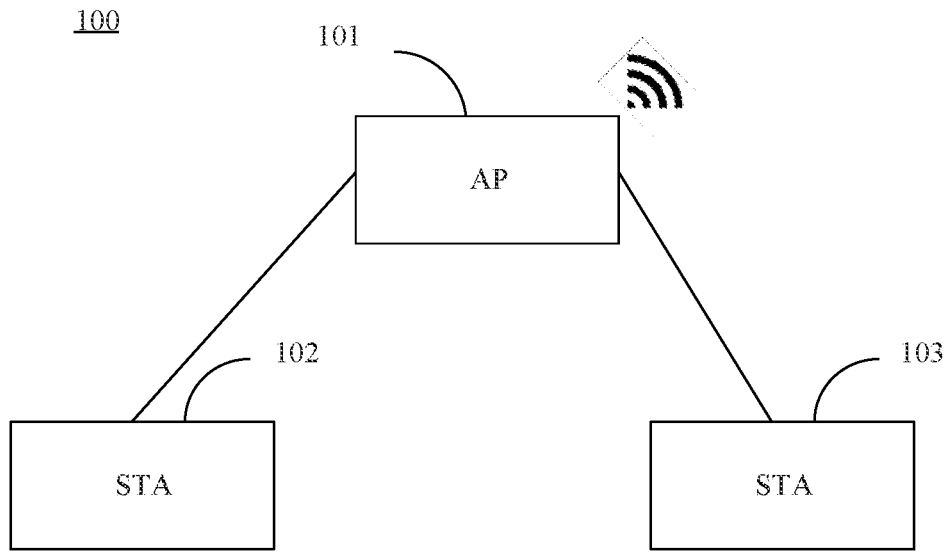
FIG. 1 is a schematic architectural diagram of a communications system according to an embodiment of this application.

FIG. 1 is a schematic architectural diagram of a communications system to which a transmission control method is applied according to an embodiment of this application. As shown in FIG. 1, the communications system 100 may include a wireless access point (AP) 101, a station (STA) 102, and a STA 103. The STA 102 and the STA 103 each may establish a WI-FI connection to the AP 101. In other words, the STA 102 and the STA 103 each may access a WI-FI network provided by the AP 101.

For example, the AP 101 in this embodiment of this application may be a wireless router. Alternatively, the AP 101 may be a device that can serve as a wireless access point (for example, a WI-FI hotspot) and provide a wireless network for another device, such as a mobile phone, a tablet computer, a desktop computer, a laptop computer, a handheld computer, a notebook computer, an ultra-mobile personal computer (UMPC), a netbook, a cellular phone, a personal digital assistant (PDA), a wearable electronic device (for example, a smartwatch), a tablet computer, an augmented reality (AR)\virtual reality (VR) device, or an in-vehicle computer. A specific form of the AP 101 is not limited in this embodiment of this application.

The STA 102 and the STA 103 in this embodiment of this application each may be a device such as a mobile phone, a tablet computer, a desktop computer, a laptop computer, a handheld computer, a notebook computer, a UMPC, a netbook, a cellular phone, a PDA, a wearable electronic device (such as a smartwatch), a tablet computer, an AR\VR device, or an in-vehicle computer. Specific forms of the STA 102 and the STA 103 are not limited in this embodiment of this application.

Figure 2:
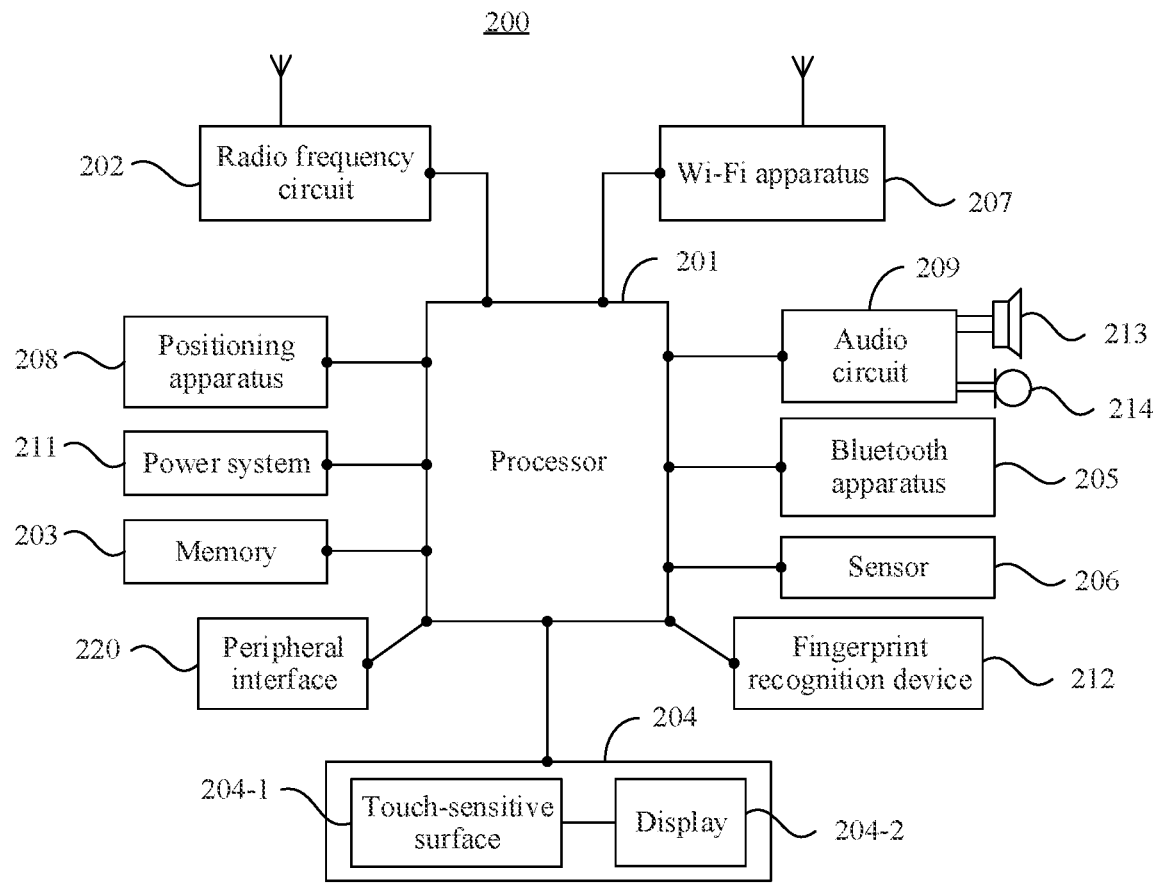
FIG. 2 is a schematic diagram of a hardware structure of a mobile phone according to an embodiment of this application.

As shown in FIG. 2, in this embodiment of this application, a device provided in this embodiment of this application is described by using an example that the AP 101, the STA 102, or the STA 103 is a mobile phone 200. A person skilled in the art may understand that the mobile phone 200 shown in FIG. 2 is merely an example, and does not constitute a limitation on the mobile phone 200. In addition, the mobile phone 200 may have more or fewer components than those shown in the figure, or may combine two or more components, or may have different component configurations. The components shown in FIG. 2 may be implemented in hardware including one or more signal processing and/or application-specific integrated circuits, software, or a combination of hardware and software.

As shown in FIG. 2, the mobile phone 200 may specifically include components such as a processor 201, a radio frequency (RF) circuit 202, a memory 203, a touchscreen 204, a Bluetooth apparatus 205, one or more sensors 206, a WI-FI apparatus 207, a positioning apparatus 208, an audio circuit 209, a peripheral interface 120, a power system 211, and a fingerprint recognition device 212. These components may perform communication with each other by using one or more communications buses or signal cables (not shown in FIG. 2).

The following describes the components of the mobile phone 200 in detail with reference to FIG. 2.

The processor 201 is a control center of the mobile phone 200. The processor 201 is connected to parts of the mobile phone 200 by using various interfaces and cables, runs or executes an application a (App) stored in the memory 203, and invokes data and an instruction that are stored in the memory 203, to perform various functions of the mobile phone 200 and process data. In some embodiments, the processor 201 may include one or more processing units. The processor 201 may further integrate an application processor and a modem processor. The application processor mainly processes an operating system, a user interface, an application, and the like. The modem processor mainly processes wireless communication. It should be understood that the modem processor may not be integrated into the processor 201. For example, the processor 201 may be a chip Kirin 960 manufactured by Huawei Technologies Co., Ltd.

The radio frequency circuit 202 may be configured to send and receive a radio signal in an information receiving and sending process or a call process. Specifically, after receiving downlink data from a base station, the radio frequency circuit 202 may send the downlink data to the processor 201 for processing. In addition, the radio frequency circuit 202 sends related uplink data to the base station. Generally, the radio frequency circuit 202 includes but is not limited to an antenna, at least one amplifier, a transceiver, a coupler, a low noise amplifier, a duplexer, and the like. In addition, the radio frequency circuit 202 may further communicate with another device through wireless communication. The wireless communication may use any communications standard or protocol, including but not limited to global system for mobile communications, general packet radio service, code division multiple access, wideband code division multiple access, long term evolution, email, SMS message service, and the like.

The memory 203 is configured to store an application and data. The processor 201 runs the application and the data that are stored in the memory 203, to perform various functions of the mobile phone 200 and process data. The memory 203 mainly includes a program storage area and a data storage area. The program storage area may store an operating system, an application required by at least one function (for example, a sound playing function and an image playing function). The data storage area may store data (for example, audio data and a phone book) created based on use of the mobile phone 200. In addition, the memory 203 may include a high-speed random access memory, and may further include a nonvolatile memory such as a magnetic disk storage device and a flash memory, or another nonvolatile solid-state storage device. The memory 203 may store various operating systems such as an iOS® operating system developed by Apple and an Android® operating system developed by Google.

The touchscreen 204 may include a touch-sensitive surface 204-1 and a display 204-2. The touch-sensitive surface 204-1 (for example, a touch panel) may collect a touch event performed by a user of the mobile phone 200 on or near the touch-sensitive screen 204-1 (for example, an operation performed by the user on the touch-sensitive surface 204-1 or near the touch-sensitive surface 204-1 by using any suitable object such as a finger or a stylus), and send collected touch information to another component, for example, the processor 201. The touch event performed by the user near the touch-sensitive surface 204-1 may be referred to as a floating touch. The floating touch may mean that the user does not need to directly touch the touchpad for selecting, moving, or dragging an object (for example, an icon), and the user only needs to be near a terminal to execute a desired function. In an application scenario of the floating touch, terms such as "touch" and "contact" do not implicitly mean to directly touch the touchscreen, but to be near or close to the touchscreen. The touch-sensitive surface 204-1 on which the floating touch can be performed may be implemented in a capacitive type, an infrared photoreceptor type, an ultrasonic wave type, or the like. The touch-sensitive surface 204-1 may include two parts: a touch detection apparatus and a touch controller. The touch detection apparatus detects a touch orientation of the user, detects a signal generated by a touch operation, and transmits the signal to the touch controller. The touch controller receives touch information from the touch detection apparatus, converts the touch information into touch point coordinates, and sends the touch point coordinates to the processor 201. The touch controller may further receive an instruction sent by the processor 201, and execute the instruction. In addition, the touch-sensitive surface 204-1 may be implemented in a plurality of types such as a resistive type, a capacitive type, an infrared type, or a surface acoustic wave type. The display 204-2 (also referred to as a display screen) may be configured to display information entered by the user or information provided for the user, and menus of the mobile phone 200. The display 204-2 may be configured in a form such as a liquid crystal display or an organic light emitting diode. The touch-sensitive surface 204-1 may cover the display 204-2. After detecting the touch event on or near the touch-sensitive surface 204-1, the touch-sensitive surface 204-1 transmits the touch event to the processor 201 to determine a type of the touch event. Then, the processor 201 may provide corresponding visual output on the display 204-2 based on the type of the touch event. Although in FIG. 2, the touch-sensitive surface 204-1 and the display 204-2 are used as two independent components to implement input and output functions of the mobile phone 200, in some embodiments, the touch-sensitive surface 204-1 and the display screen 204-2 may be integrated to implement the input and output functions of the mobile phone 200. It may be understood that the touchscreen 204 is formed by stacking a plurality of layers of materials. Only the touch-sensitive surface (layer) and the display screen (layer) are presented in this embodiment of this application, and other layers are not recorded in this embodiment of this application. In addition, in some other embodiments of this application, the touch-sensitive surface 204-1 may cover the display 204-2, and a size of the touch-sensitive surface 204-1 is greater than a size of the display screen 204-2. Therefore, the display screen 204-2 is entirely covered by the touch-sensitive surface 204-1. Alternatively, the touch-sensitive surface 204-1 may be disposed on a front side of the mobile phone 200 in a full panel form. In other words, any touch performed by the user on the front side of the mobile phone 200 can be sensed by the mobile phone 200. In this way, full touch control experience on the front side of the mobile phone 200 can be implemented. In some other embodiments, the touch-sensitive surface 204-1 is disposed on a front side of the mobile phone 200 in a full panel form, and the display screen 204-2 may also be disposed on the front side of the mobile phone 200 in a full panel form. In this way, a bezel-less structure can be implemented on the front side of the mobile phone 200.

The mobile phone 200 may further include the Bluetooth apparatus 205, configured to exchange data between the mobile phone 200 and another terminal (for example, a mobile phone or a smartwatch) over a short distance. In this embodiment of this application, the Bluetooth apparatus may be an integrated circuit, a Bluetooth chip, or the like.

The mobile phone 200 may further include at least one type of sensor 206, such as an optical sensor, a motion sensor, and another sensor. Specifically, the optical sensor may include an ambient light sensor and a proximity sensor. The ambient light sensor may adjust luminance of the display of the touchscreen 204 based on intensity of ambient light. The proximity sensor may power off the display when the mobile phone 200 is moved to an ear. As one type of the motion sensor, an accelerometer sensor may detect acceleration values in all directions (usually on three axes). The accelerometer sensor may detect a value and a direction of gravity when the accelerometer sensor is stationary, and may be applied to an application for recognizing a posture (such as switching between landscape mode and portrait mode, a related game, or magnetometer posture calibration) of the mobile phone 200, a function related to vibration recognition (such as a pedometer or a knock), and the like. Other sensors such as a gyroscope, a barometer, a hygrometer, a thermometer, and an infrared sensor may be further disposed on the mobile phone 200. Details are not described herein.

In embodiments of this application, the mobile phone 200 may further have a fingerprint recognition function. For example, the fingerprint recognition device 212 may be disposed on a back side of the mobile phone 200 (for example, below a rear-facing camera), or the fingerprint recognition device 212 is disposed on the front side of the mobile phone 200 (for example, below the touchscreen 204, or on a home button of the mobile phone 200). In addition, the fingerprint recognition device 212 may be disposed on the touchscreen 204 to implement the fingerprint recognition function. In other words, the fingerprint recognition device 212 may be integrated with the touchscreen 204 to implement the fingerprint recognition function of the mobile phone 200. In this case, the fingerprint recognition device 212 may be disposed on the touchscreen 204 as a part of the touchscreen 204, or may be disposed on the touchscreen 204 in another manner. In addition, the fingerprint recognition device 212 may be further implemented as a full-panel fingerprint recognition device. In this case, the touchscreen 204 may be considered as a panel on which a fingerprint may be collected in any position. In some embodiments, the fingerprint recognition device 212 may process a collected fingerprint. For example, the fingerprint recognition device 212 may process, for example, verify, the collected fingerprint. The fingerprint recognition device 212 may further send a fingerprint verification result (for example, whether the fingerprint verification succeeds) to the processor 201, so that the processor 201 makes a corresponding response based on the received fingerprint verification result. In some other embodiments, the fingerprint recognition device 212 may alternatively send a collected fingerprint to the processor 201, so that the processor 201 processes the fingerprint (for example, verifies the fingerprint). A main component of the fingerprint recognition device 212 in this embodiment of this application is a fingerprint sensor. The fingerprint sensor may use any type of sensing technology, which includes but is not limited to an optical sensing technology, a capacitive sensing technology, a piezoelectric sensing technology, an ultrasonic sensing technology, and the like.

The Wi-Fi apparatus 207 is configured to provide the mobile phone 200 with network access that complies with a Wi-Fi related standard or protocol. The mobile phone 200 may access a Wi-Fi access point by using the Wi-Fi apparatus 207, to help the user send and receive an email, browse a web page, access streaming media, and the like. The Wi-Fi apparatus 207 provides wireless broadband internet access for the user. In some other embodiments, the Wi-Fi apparatus 207 may be used as a Wi-Fi access point, and may provide Wi-Fi network access for another terminal.

The positioning apparatus 208 is configured to provide a geographic location for the mobile phone 200. It may be understood that the positioning apparatus 208 may be a receiver of a positioning system such as a Global Positioning System (GPS) or a BEIDOU navigation satellite system. After receiving a geographic location sent by the positioning system, the positioning apparatus 208 sends the information to the processor 201 for processing, or sends the information to the memory 203 for storage. In some other embodiments, the positioning apparatus 208 may be a receiver of an Assisted GPS (AGPS). The AGPS runs in a manner in which GPS positioning is performed with specific assistance. The AGPS may use a signal of a base station together with a GPS satellite signal, to speed up positioning performed by the mobile phone 200. In the AGPS system, the positioning apparatus 208 may obtain positioning assistance through communication with an assisted positioning server (for example, a positioning server of the mobile phone 200). The AGPS system assists the positioning apparatus 208 as an assisted server, to implement ranging and positioning services. In this case, the assisted positioning server communicates with the positioning apparatus 208 (that is, a GPS receiver) of the terminal such as the mobile phone 200 by using a wireless communications network, to provide positioning assistance.

The audio circuit 209, a loudspeaker 213, and a microphone 214 may provide an audio interface between the user and the mobile phone 200. In one aspect, the audio circuit 209 may convert received audio data into an electrical signal and transmit the electrical signal to the speaker 213, and the speaker 213 converts the electrical signal into a sound signal for output. In another aspect, the microphone 214 converts a collected sound signal into an electrical signal, and the audio circuit 209 receives the electrical signal, converts the electrical signal into audio data, and then outputs the audio data to the RF circuit 202, to send the audio data to, for example, another mobile phone, or outputs the audio data to the memory 203 for further processing.

The peripheral interface 220 is configured to provide various interfaces for an external input/output device (for example, a keyboard, a mouse, a display externally connected to the mobile phone 200, an external memory, or a subscriber identity module card). For example, the mobile phone 200 is connected to the mouse by using a universal serial bus interface, and the mobile phone is connected, by using a metal contact on a card slot of the subscriber identity module (Subscriber Identity Module, SIM) card, to the subscriber identity module card provided by a telecommunications operator. The peripheral interface 220 may be configured to couple the external input/output peripheral device to the processor 201 and the memory 203.

The mobile phone 200 may further include the power supply apparatus 211 (for example, a battery and a power supply management chip) that supplies power to the components. The battery may be logically connected to the processor 201 by using the power supply management chip, so that functions such as charging management, discharging management, and power consumption management are implemented by using the power supply apparatus 211.

Although not shown in FIG. 2, the mobile phone 200 may further include a camera (a front-facing camera and/or a rear-facing camera), a flash, a micro projection apparatus, an NFC apparatus, and the like. Details are not described herein.

All methods in the following embodiments may be implemented on the mobile phone 200 having the foregoing hardware structure.

In a first application scenario of an embodiment of this application, a method in this embodiment of this application may be applied to a process in which the STA 102 or the STA 103 establishes a Wi-Fi connection to the AP 101 (namely, a Wi-Fi hotspot). In this embodiment of this application, the method is described herein by using an example in which the STA 102 establishes a Wi-Fi connection to the AP 101.

Figure 3:
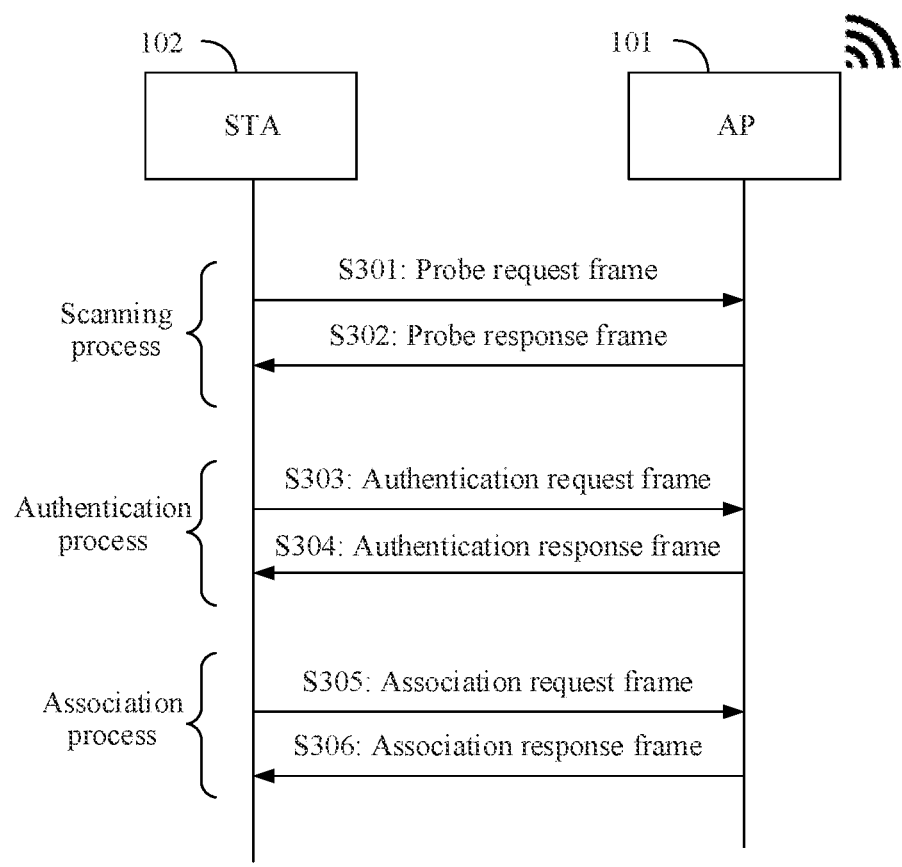
FIG. 3 is a schematic diagram of a procedure for establishing a Wi-Fi connection according to an embodiment of this application.

The procedure in which the STA 102 establishes the Wi-Fi connection to the AP 101 may specifically include a scanning process S301 and S302, an authentication process S303 and S304, and an association process S305 and S306 that are shown in FIG. 3.

S301: The STA 102 sends a probe request (Probe Request) frame to the AP 101.

The STA 102 may search for an AP through scanning. To be specific, the STA searches for an SSID transmitted by the AP. During roaming, a STA searches for and is connected to a new AP. The STA may perform a search on each available channel. The STA may search for the AP in two manners: an active manner and a passive manner.

In S301 in this embodiment of this application, the active scanning search manner is used as an example. The STA may sequentially send a probe request frame on all available channels (for example, 13 channels). The probe request frame carries an SSID of the AP. The probe request frame is used to search for the AP with the SSID.

In the passive scanning search manner, the STA may discover the AP by listening to a beacon (Beacon) frame periodically sent by the AP. The beacon frame may provide related information about the AP and a basic service set (Basic Service Set, BSS) to which the AP belongs.

S302: The AP 101 returns a probe response (Probe Response) frame to the STA 102.

The AP 101 may receive the probe request frame that is sent by the STA 102 and that carries an SSID. When the SSID carried in the probe request frame is the same as the SSID of the AP, the AP responds to the probe request frame, and returns the probe response frame to the STA.

S303: The STA 102 sends an authentication request (Authentication Request) frame to the AP 101.

After receiving the probe response frame sent by the AP 101, the STA 102 may send the authentication request frame to the AP 101 for authentication on the STA 102.

S304: The AP 101 returns an authentication response (Authentication Response) frame to the STA 102.

After receiving the authentication request frame, the AP 101 may perform authentication on the STA 102. After the authentication succeeds, the AP 101 returns the authentication response frame to a second device 102, to indicate that the authentication succeeds.

S305: The STA 102 sends an association request (Association Request) frame to the AP 101.

After the authentication performed on the STA 102 succeeds, all preparations for the Wi-Fi connection are completed. In this case, the STA 102 may initiate a connection request, namely, the association request frame, to the AP 101, to request to access a Wi-Fi network provided by the AP 101.

S306: The AP 101 returns an association response (Association Response) frame to the STA 102.

After receiving the association request frame, the AP 101 may respond to the association request frame, and send the association response frame to the STA 102. In this case, the Wi-Fi connection is completed, and the STA 102 may transmit data by using the Wi-Fi network provided by the AP 101.

It may be understood that, in the foregoing process of establishing the Wi-Fi connection, an error may occur on the Wi-Fi connection in any one of the scanning process, the authentication process, or the association process, resulting in a Wi-Fi connection failure. An embodiment of this application provides a transmission control method, to detect, in time, that an error occurs on a Wi-Fi connection, and perform error tolerance processing in time.

Figure 4:
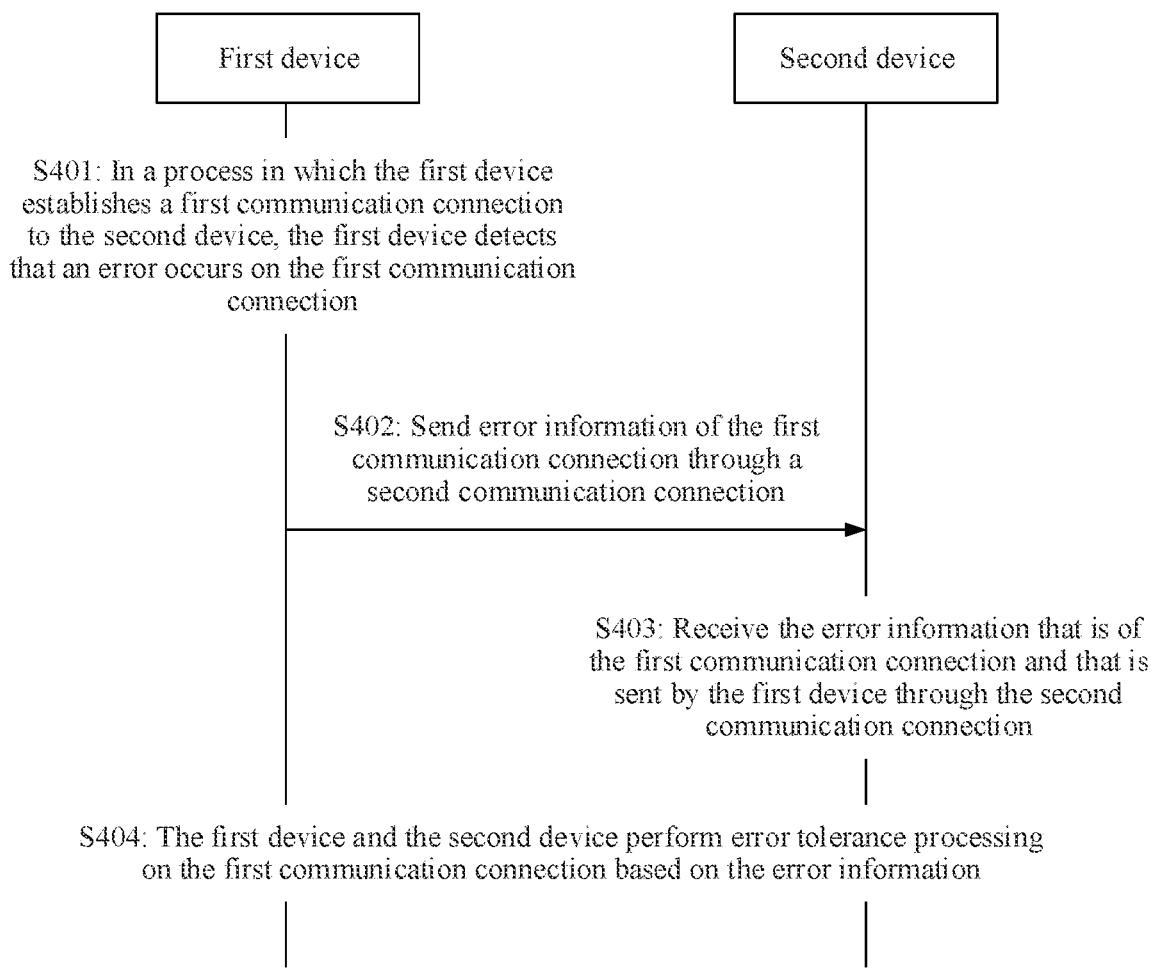
FIG. 4 is a schematic flowchart 1 of a transmission control method according to an embodiment of this application.

In a first application scenario, the transmission control method is applied to a process in which a first device establishes a first communication connection to a second device. In this embodiment of this application, the first device may be the STA 102, and the second device may be the AP 101. Alternatively, the first device may be the AP 101, and the second device may be the STA 102. As shown in FIG. 4, the transmission control method may include S401 to S404.

S401: In the process in which the first device establishes the first communication connection to the second device, the first device detects that an error occurs on the first communication connection.

In a first implementation of this embodiment of this application, it is assumed that the first device is the STA 102, the second device is the AP 101, and the first communication connection is a Wi-Fi connection. In the first implementation, the STA 102 may determine that an error occurs on the Wi-Fi connection.

Specifically, that the STA 102 determines that an error occurs on the Wi-Fi connection may include: If the STA 102 does not receive, within a first preset time after performing S301, a probe response frame sent by the AP 101, the STA 102 determines that the error occurs on the Wi-Fi connection. Alternatively, if the STA 102 does not receive, within a first preset time after performing S303, an authentication response frame sent by the AP 101, the STA 102 determines that the error occurs on the Wi-Fi connection. Alternatively, if the STA 102 does not receive, within a first preset time after performing S305, an association response frame sent by the AP 101, the STA 102 determines that the error occurs on the Wi-Fi connection.

In the first implementation, the error occurring on the Wi-Fi connection may be caused by a fault occurring on the AP 101. The fault occurring on the AP 101 may include at least Case (1), Case (2), and Case (3).

In Case (1), a Wi-Fi apparatus of the AP 101 is faulty, and cannot send and receive a Wi-Fi frame.

In the first application scenario, based on Case (1), the Wi-Fi apparatus of the AP 101 is faulty, and cannot receive a probe request frame, an authentication request frame, or an association request frame sent by the STA 102. Therefore, the Wi-Fi apparatus cannot send the probe response frame, the authentication response frame, or the association response frame to the STA 102. Alternatively, the Wi-Fi apparatus of the AP 101 is faulty, and can only receive a probe request frame, an authentication request frame, or an association request frame sent by the STA 102, but cannot send the probe response frame, the authentication response frame, or the association response frame to the STA 102.

In Case (2), the AP 101 encounters a network fault, and cannot provide a Wi-Fi network.

For example, when the AP 101 is a wireless router, the network fault occurring on the AP 101 may be a fiber optic network fault occurring on the wireless router. When the AP 101 is a Wi-Fi hotspot provided by a terminal (for example, a mobile phone), the network fault occurring on the AP 101 may be a mobile network (for example, a fourth generation of mobile phone mobile communications standards (Fourth Generation of mobile phone mobile communications standards, 4G) network) fault occurring on the mobile phone.

In Case (3), another component of the AP 101 is faulty, and cannot assist the Wi-Fi apparatus in sending and receiving a Wi-Fi frame.

In addition to the faults described in Case (1) and Case (2), when the another component of the AP 101 is faulty, and cannot assist the Wi-Fi apparatus in sending and receiving the Wi-Fi frame, the Wi-Fi apparatus may also fail to send and receive the Wi-Fi frame. For example, the another component of the AP 101 may be a CPU of the AP 101.

Optionally, that the AP 101 is faulty may further include: The AP 101 is powered off. When the AP 101 is powered off, the AP 101 cannot send and receive a Wi-Fi frame either.

In the first implementation, the error occurring on the Wi-Fi connection may alternatively be caused by a fault occurring on the STA 102. The fault occurring on the STA 102 may include at least Case (4).

In Case (4), a Wi-Fi apparatus of the STA 102 is faulty, and cannot receive a Wi-Fi frame sent by the AP 101.

In the first application scenario, based on Case (4), after the STA 102 sends a probe request frame, an authentication request frame, or an association request frame, the Wi-Fi apparatus of the STA 102 is faulty. In this case, the STA 102 cannot receive the probe response frame, the authentication response frame, or the association response frame sent by the AP 101.

Alternatively, that the STA 102 determines that an error occurs on the Wi-Fi connection may include: After receiving a probe response frame, if the STA 102 cannot perform S303, that is, cannot send an authentication request frame to the AP 101, the STA 102 determines that the error occurs on the Wi-Fi connection. Alternatively, after receiving an authentication response frame, if the STA 102 cannot perform S305, that is, cannot send an association request frame to the AP 101, the STA 102 determines that the error occurs on the Wi-Fi connection. The error occurring on the Wi-Fi connection may be caused by a fault occurring on the Wi-Fi apparatus of the STA 102.

In a second implementation of this embodiment of this application, it is assumed that the first device is the AP 101, the second device is the STA 102, and the first communication connection is a Wi-Fi connection. In the second implementation, the AP 101 may determine that an error occurs on the Wi-Fi connection.

Specifically, that the AP 101 may determine that an error occurs on the Wi-Fi connection may include: If the AP 101 does not receive, within a second preset time after performing S302, that is, sending a probe response frame to the STA 102, an authentication request frame sent by the STA 102, the AP 101 determines that the error occurs on the Wi-Fi connection. Alternatively, if the AP 101 does not receive, within a second preset time after performing S304, that is, sending an authentication response frame to the STA 102, an association request frame sent by the STA 102, the AP 101 determines that the error occurs on the Wi-Fi connection.

In the second implementation, the error occurring on the Wi-Fi connection may be caused by a fault occurring on the AP 101. The fault occurring on the AP 101 may include at least Case (5), Case (6), and Case (7).

In Case (5), a Wi-Fi apparatus of the AP 101 is faulty, and cannot send and receive a Wi-Fi frame.

In the first application scenario, based on Case (5), the Wi-Fi apparatus of the AP 101 is faulty, and cannot receive the authentication request frame or the association request frame sent by the STA 102.

In Case (6), the AP 101 encounters a network fault, and cannot provide a Wi-Fi network. For a detailed description of Case (6), refer to the detailed description of Case (2). Details are not described in this embodiment of this application again.

In Case (7), another component of the AP 101 is faulty, and cannot assist the Wi-Fi apparatus in sending and receiving a Wi-Fi frame. For a detailed description of Case (7), refer to the detailed description of Case (3). Details are not described in this embodiment of this application again.

In the second implementation, the error occurring on the Wi-Fi connection may alternatively be caused by a fault occurring on the STA 102. The fault occurring on the STA 102 side may include at least Case (8).

In Case (8), a Wi-Fi apparatus of the STA 102 is faulty, and cannot send a Wi-Fi frame to the AP 101.

In the first application scenario, based on Case (8), the STA 102 cannot receive the probe response frame, the authentication response frame, or an association response frame, and cannot send the authentication request frame or the association request frame either.

In a third implementation of this embodiment of this application, it is assumed that the first communication connection is a Wi-Fi connection. That an error occurs on the Wi-Fi connection may include the following case: Because the first device or the second device does not support 5G Wi-Fi, a 5G Wi-Fi connection cannot be established.

S402: The first device sends error information of the first communication connection to the second device through a second communication connection.

For example, the first communication connection is a Wi-Fi connection, and the second communication connection is a Bluetooth connection. After determining that an error occurs on the Wi-Fi connection, the first device may send error information of the Wi-Fi connection to the second device. The error information is used to indicate that the error occurs on the Wi-Fi connection between the first device and the second device.

In some embodiments, before S401 is performed, Bluetooth on the first device and Bluetooth on the second device are both enabled, and the first device has established a Bluetooth connection to the second device. In other words, before S401, the first device has established the second communication connection to the second device. In this case, when detecting that the error occurs on the Wi-Fi connection, the first device may directly send the error information to the second device through the Bluetooth connection between the first device and the second device.

It may be understood that devices that establishes Bluetooth connections to the first device include but are not limited to the second device. The first device needs to obtain an identifier of the second device. The first device selects, based on the identifier of the second device, the second device from the devices that establish the Bluetooth connections to the first device. In this embodiment of this application, the identifier of the second device may be used to uniquely identify the second device. For example, the identifier of the second device may be a media access control (MAC) address of the second device. When detecting that the error occurs on the Wi-Fi connection between the first device and the second device, the first device may obtain the MAC address (for example, a MAC address 1) of the second device. Then, the first device may search the devices that establish the Bluetooth connections to the first device for a device whose MAC address is the MAC address 1. Finally, the first device may send the error information to the found device through the Bluetooth connection.

Figure 5:
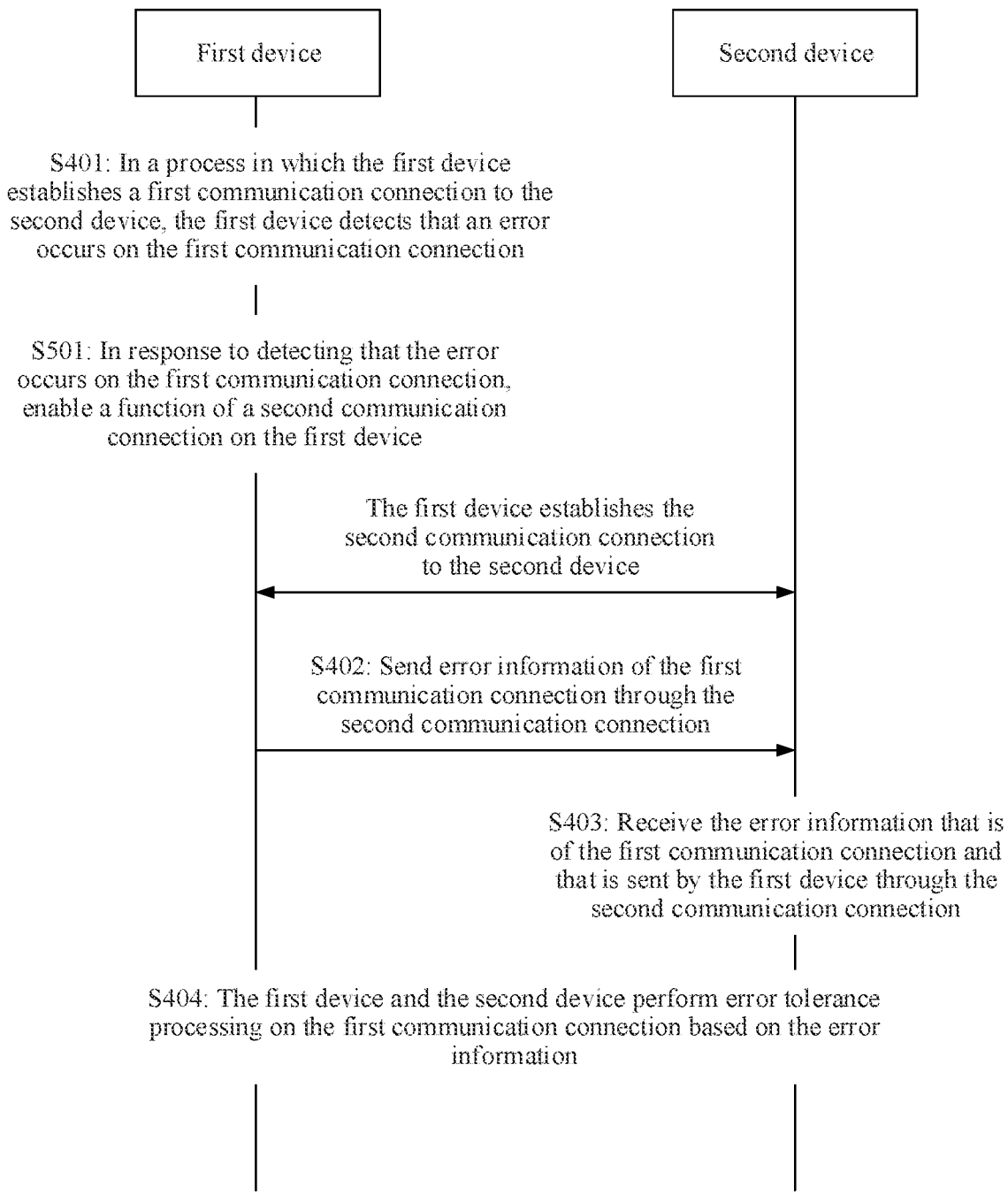
FIG. 5 is a schematic flowchart 2 of a transmission control method according to an embodiment of this application.

In some other embodiments, a function of the second communication connection (for example, the Bluetooth connection) on the second device is enabled. Before S402, a function of the second communication connection on the first device is disabled. As shown in FIG. 5, after S401 and before S402, the method in this embodiment of this application further includes S501:

S501: In response to detecting that the error occurs on the first communication connection, the first device enables the function of the second communication connection on the first device, and establishes the second communication connection to the second device.

For example, it is assumed that the first communication connection is a Wi-Fi connection, and the second communication connection is a Bluetooth connection. Bluetooth on the second device is enabled, that is, Bluetooth on the second device is started. Before S402. Bluetooth on the first device may be disabled. In response to detecting that the error occurs on the Wi-Fi connection, the first device may enable Bluetooth on the first device, and establish the Bluetooth connection to the second device.

Only when detecting that the error occurs on the first communication connection, the first device enables the function of the second communication connection on the first device, and establishes the second communication connection to the second device. In this way, power consumption of the first device can be reduced.

Figure 6:
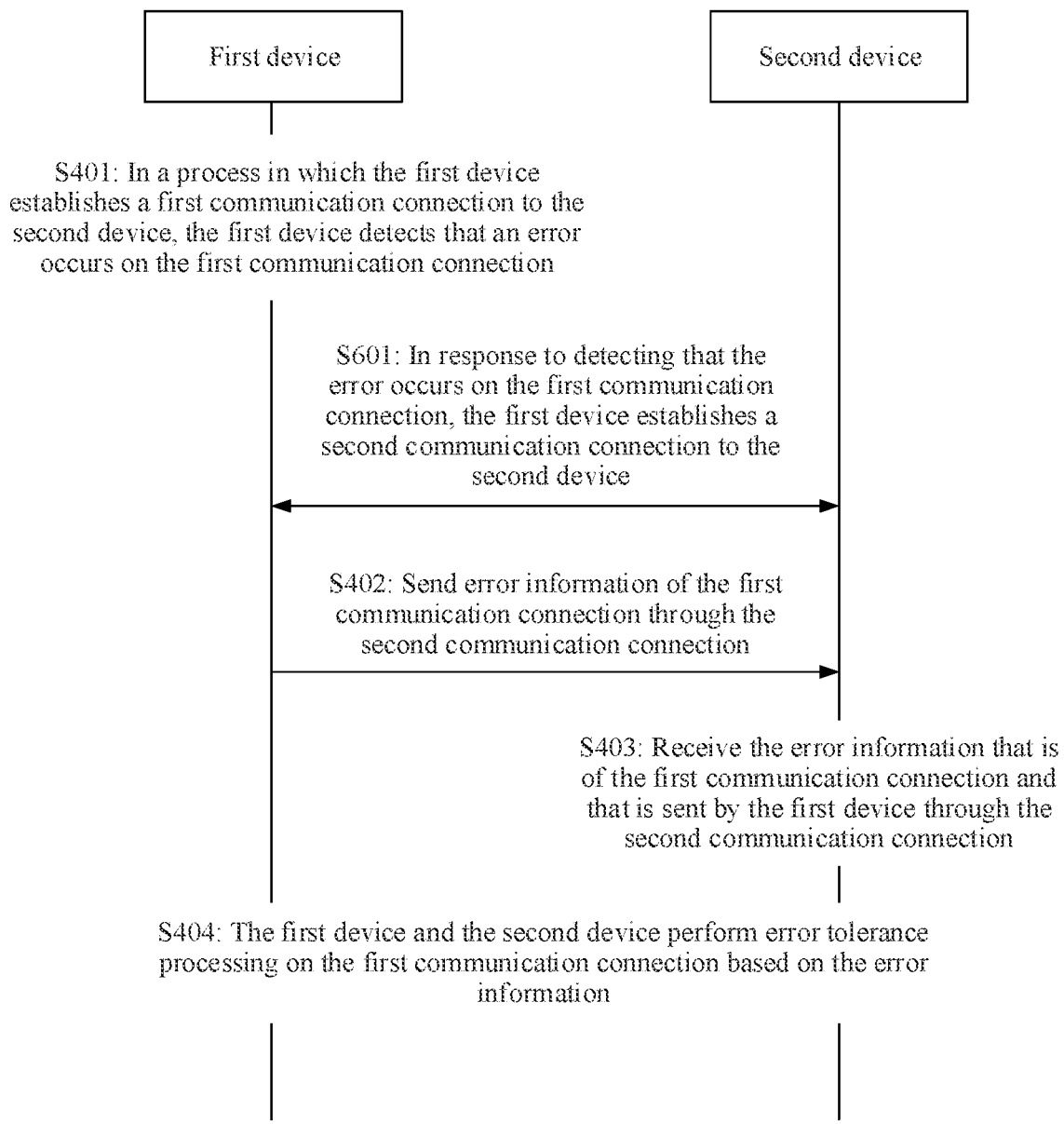
FIG. 6 is a schematic flowchart 3 of a transmission control method according to an embodiment of this application.

In some other embodiments, a function of the second communication connection on the second device is enabled. Before S402, a function of the second communication connection on the first device is enabled. However, the first device has not established the second communication connection to the second device. As shown in FIG. 6, after S401 and before S402, the method in this embodiment of this application further includes S601:

S601: In response to detecting that the error occurs on the first communication connection, the first device establishes the second communication connection to the second device.

For example, it is assumed that the first communication connection is a Wi-Fi connection, and the second communication connection is a Bluetooth connection. Before S402. Bluetooth on the first device may be enabled. However, the first device has not established the Bluetooth connection to the second device. In response to detecting that the error occurs on the Wi-Fi connection, the first device may establish the Bluetooth connection to the second device.

It may be understood that, before S501 or S601, that is, before establishing the second communication connection to the second device, the first device may find a plurality of Bluetooth devices. The first device needs to obtain an identifier of the second device, and then searches, based on the identifier of the second device, the plurality of Bluetooth devices for a Bluetooth device corresponding to the identifier. The first device establishes a Bluetooth connection to the found Bluetooth device, and sends the error information to the found Bluetooth device. The identifier of the second device may be used to uniquely identify the second device. For example, the identifier of the second device may be a MAC address of the second device. The first device may obtain the MAC address (for example, a MAC address 1) of the second device. Then, the first device may search the found Bluetooth devices for a device whose MAC address is the MAC address 1. Finally, the first device may establish a Bluetooth connection to the found Bluetooth device, and send the error information to the found Bluetooth device.

The first device may send a Bluetooth frame that carries the error information, to the second device through the Bluetooth connection between the first device and the second device based on a Bluetooth protocol.

For example, in an implementation, the first device may send the BLUETOOTH frame that carries the error information, to the second device based on a BLUETOOTH Serial Port Profile (SPP) protocol.

Figure 7:
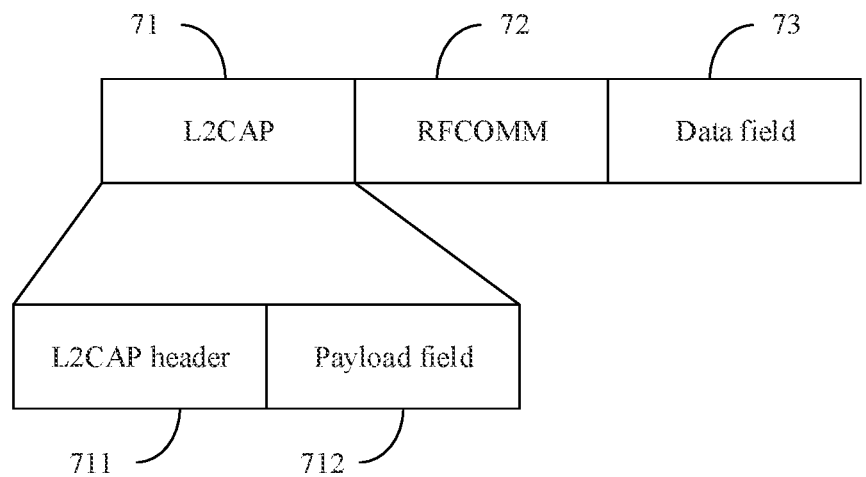
FIG. 7 is a schematic diagram 1 of a frame structure instance of a Bluetooth frame according to an embodiment of this application.

FIG. 7 is a schematic diagram of a frame structure instance of an SPP BLUETOOTH frame (that is, a BLUETOOTH frame sent based on the SPP protocol) according to an embodiment of this application. As shown in FIG. 7, the SPP BLUETOOTH frame may include a Logical Link Control and Adaptation Protocol (L2CAP) field 71, an RFCOMM field 72, and a data field 73. The error information may be carried in the data field 73 of the SPP BLUETOOTH frame, or the error information may be carried in the L2CAP field 71 of the SPP BLUETOOTH frame. The L2CAP field 71 includes an L2CAP header 711 and a payload field 712. For example, the error information may be carried in the payload field 712 of the L2CAP field 71.

Figure 8:
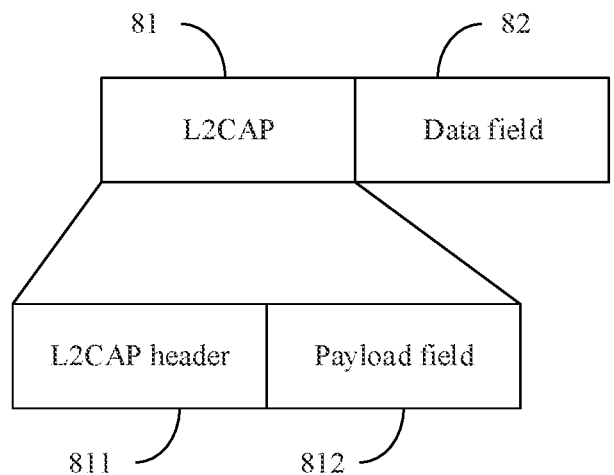
FIG. 8 is a schematic diagram 2 of a frame structure instance of a Bluetooth frame according to an embodiment of this application.

Alternatively, the error information may be carried in an L2CAP field 81 or a data field 82 of a Bluetooth frame shown in FIG. 8. For example, the L2CAP field 81 may include an L2CAP header 811 and a payload field 812, and the error information may be carried in the L2CAP header 811 or the payload field 812.

Figure 9:
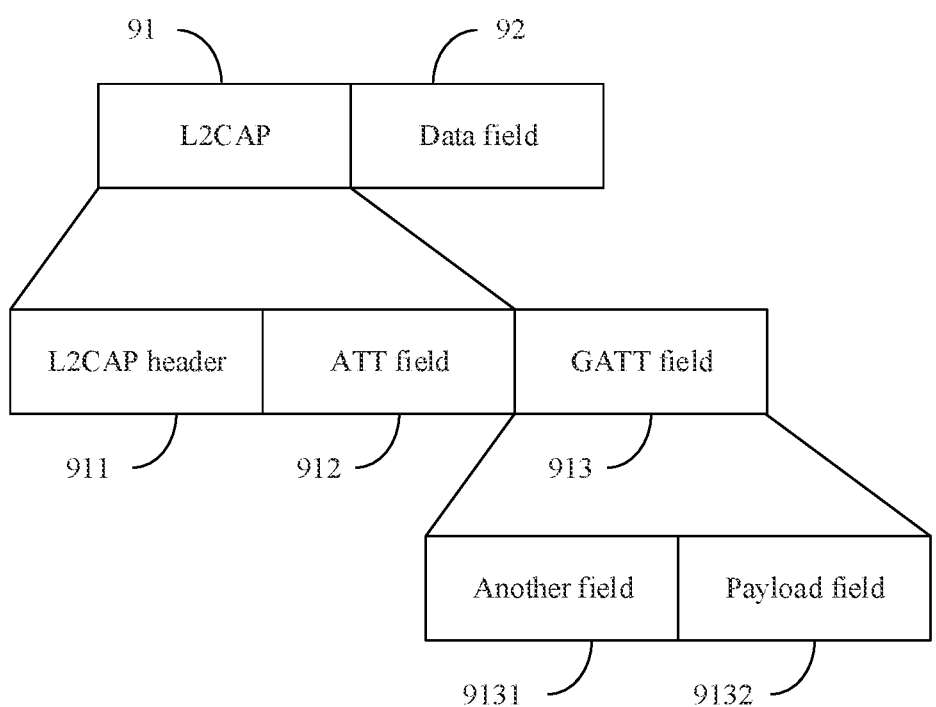
FIG. 9 is a schematic diagram 3 of a frame structure instance of a Bluetooth frame according to an embodiment of this application.

In another implementation, the BLUETOOTH frame may be a BLE BLUETOOTH frame based on the Generic Attribute Protocol (GATT). FIG. 9 is a schematic diagram of a frame structure instance of a BLE BLUETOOTH frame according to an embodiment of this application. As shown in FIG. 9, the BLE BLUETOOTH frame may include an L2CAP field 91 and a data field 92. The error information may be carried in the data field 92 of the BLE BLUETOOTH frame, or the error information may be carried in the L2CAP field 91 of the BLE BLUETOOTH frame. As shown in FIG. 9, the L2CAP field 91 may include an L2CAP header 911, an Attribute Protocol (ATT) field 912, and a GATT field 913. The GATT field 913 may include another field 9131 and a payload field 9132. Specifically, the error information may be carried in the L2CAP header 911 or the payload field 9132.

Optionally, the error information includes an error code of the Wi-Fi connection. The error code is used to indicate a reason of the error that occurs on the Wi-Fi connection between the first device and the second device. For example, the error code 00 indicates that the Wi-Fi apparatus of the AP 101 is faulty; the error code 01 indicates that the Wi-Fi apparatus of the STA 102 is faulty; the error code 10 indicates that the AP 101 has the network fault; and the error code 11 indicates that the AP 101 or the STA 102 does not support 5G Wi-Fi. It should be noted that the error codes in this embodiment of this application include but are not limited to "00", "01", "10", and "11". Details of other forms of error codes are not described in this embodiment of this application.

Optionally, in this embodiment of this application, the second communication connection may be a communication connection that is in possible communication connections between the first device and the second device other than the first communication connection and that meets a preset condition. After detecting that the error occurs on the first communication connection, the first device may select, from the possible communication connections between the first device and the second device other than the first communication connection, the communication connection that meets the preset condition.

In an implementation, a method for selecting the second communication connection by the first device may include the following: When there is a communication connection between the first device and the second device other than the first communication connection, the first device determines that the another communication connection is the second communication connection. For example, it is assumed that the first communication connection is a Wi-Fi connection. Not only the Wi-Fi connection is established between the first device and the second device, but also a Bluetooth connection is established between the first device and the second device. In this case, when the first device detects that an error occurs on the Wi-Fi connection, the first device determines that the Bluetooth connection is the second communication connection.

Optionally, before sending the error information to the second device through the Bluetooth connection, the first device may provide first prompt information. The first prompt information is used to indicate that the error occurs on the first communication connection, and request a user to determine to send the error information to the second device through the Bluetooth connection. A manner for providing the first prompt information by the first device may include: displaying, by the first terminal, a screen including the first prompt information, or playing, by the first terminal, the first prompt information through a voice prompt.

For example, it is assumed that a mobile phone 200 is the first device, and a mobile phone 300 is the second device; and the mobile phone 200 is the STA 102, and the mobile phone 300 is the AP 101. In a process in which the mobile phone 200 establishes a Wi-Fi connection to the mobile phone 300, the mobile phone 200 detects that an error occurs on the Wi-Fi connection. The mobile phone 200 may display first prompt information 1001 shown in FIG. 10. The first prompt information 1001 may be "Fail to establish a Wi-Fi connection to the mobile phone 300. Whether to notify the mobile phone 300 of error information through Bluetooth?". In response to a user's selection operation on a "Yes" button shown in FIG. 10, the mobile phone 200 may send the error information to the mobile phone 300 through Bluetooth.

In another implementation, a method for selecting the second communication connection by the first device may include the following: When there is one or more communication connections between the first device and the second device other than the first communication connection, the first device may select, from the one or more communication connections, a communication connection through which power consumption is relatively low or a transmission rate is relatively high as the second communication connection.

In this embodiment of this application, the communication connection through which power consumption is relatively low is a communication connection that is in a plurality of communication connections for transmitting same data and through which power consumption is lowest. For example, it is assumed that the first communication connection is a Wi-Fi connection. Not only the Wi-Fi connection is established between the first device and the second device, but also a Bluetooth connection and a ZigBee connection are established between the first device and the second device. It is assumed that power consumption of data transmission through the Bluetooth connection is lower than power consumption of data transmission through the ZigBee connection. In this case, when detecting that an error occurs on the Wi-Fi connection, the first device may determine that the Bluetooth connection is the second communication connection.

In this embodiment of this application, the communication connection through which a transmission rate is relatively high is a communication connection that is in a plurality of communication connections for transmitting same data and through which a transmission rate is highest. For example, it is assumed that the first communication connection is a Wi-Fi connection. Not only the Wi-Fi connection is established between the first device and the second device, but also a Bluetooth connection and a USB connection are established between the first device and the second device. It is assumed that a rate of data transmission through the USB connection is higher than a rate of data transmission through the Bluetooth connection. In this case, when detecting that an error occurs on the Wi-Fi connection, the first device may determine that the USB connection is the second communication connection.

In another implementation, a method for selecting the second communication connection by the first device may include the following: When there are a plurality of communication connections between the first device and the second device other than the first communication connection, the first device displays a first screen. The first screen includes options for the plurality of communication connections. In response to a user's selection operation on the options for the plurality of communication connections, the first device uses a communication connection selected by the user as the second communication connection.

For example, it is assumed that a mobile phone 200 is the first device, and a mobile phone 300 is the second device; and the mobile phone 200 is the STA 102, and the mobile phone 300 is the AP 101. The mobile phone 200 establishes a Bluetooth connection and a USB connection to the mobile phone 300. In a process in which the mobile phone 200 establishes a Wi-Fi connection to the mobile phone 300, the mobile phone 200 detects that an error occurs on the Wi-Fi connection. The mobile phone 200 may display a first screen 1101 shown in FIG. 11. The first screen 1101 includes an option 1102 for the Bluetooth connection and an option 1103 for the USB connection. The mobile phone 200 may select the Bluetooth connection as the second communication connection in response to a user's selection operation (for example, a tap operation) on the option 1102 for the Bluetooth connection, and the mobile phone 200 may send error information to the mobile phone 300 through the Bluetooth connection.

The first screen 1101 may further include second prompt information 1104. The second prompt information 1104 is used to indicate that the error occurs on the Wi-Fi connection, and indicate the user to select, from to-be-selected communication connections, a communication connection through which the error information is to be sent to the mobile phone 300. For example, the second prompt information 1104 may be "Fail to establish a Wi-Fi connection to the mobile phone 300. Please select a communication connection to notify the mobile phone 300 of error information!" In response to a user's selection operation on a "Cancel" button shown in FIG. 11, the mobile phone 200 may not need to send the error information to the mobile phone 300 through any one of the communication connections, and the mobile phone 300 may stop establishing the Wi-Fi connection to the mobile phone 300.

In another implementation, a method for selecting the second communication connection by the first device may include the following: When there is only the first communication connection between the first device and the second device, the first device may request to establish the second communication connection to the second device. In this implementation, the second communication connection may be any one of the possible communication connections between the first device and the second device. Alternatively, the second communication connection may be a communication connection that is in the possible communication connections between the first device and the second device and through which power consumption is relatively low or a transmission rate is relatively high.

In another implementation, a method for selecting the second communication connection by the first device may include the following: When there is only the first communication connection between the first device and the second device, the first device may request to establish a communication connection (that is, the second communication connection) selected by a user, to the second device. Specifically, the first device may display a third screen in response to detection of the error that occurs on the first communication connection. The third screen includes options for the possible communication connections between the first device and the second device. In response to a user's selection operation on the options for the communication connections, the first device may request to establish the second communication connection corresponding to an option selected by the user, to the second device.

For example, it is assumed that a mobile phone 200 is the first device, and a mobile phone 300 is the second device; and the mobile phone 200 is the STA 102, and the mobile phone 300 is the AP 101. In a process in which the mobile phone 200 establishes a Wi-Fi connection to the mobile phone 300, the mobile phone 200 detects that an error occurs on the Wi-Fi connection. The mobile phone 200 may display a third screen 1201 shown in FIG. 12. The third screen 1201 includes an option 1202 for a Bluetooth connection, an option 1203 for a USB connection, an option 1204 for a ZigBee connection, and the like. The mobile phone 200 may select the Bluetooth connection as the second communication connection in response to a user's selection operation (for example, a tap operation) on the option 1202 for the Bluetooth connection, and the mobile phone 200 may request to establish the Bluetooth connection to the mobile phone 300, and send error information to the mobile phone 300 through the Bluetooth connection.

Optionally, the third screen 1201 may further include third prompt information 1205. The third prompt information 1205 is used to indicate that the error occurs on the Wi-Fi connection, and indicate the user to select a communication connection from to-be-selected communication connections, so that the mobile phone 20 establishes the corresponding communication connection to the mobile phone 300, and sends the error information to the mobile phone 300 through the communication connection. For example, the third prompt information 1205 may be "Fail to establish a Wi-Fi connection to the mobile phone 300. Please select a communication connection, so that the mobile phone 200 establishes the communication connection to the mobile phone 300, and notifies the mobile phone 300 of error information through the communication connection!"

S403: The second device receives the error information that is of the first communication connection and that is sent by the first device through the second communication connection.

Based on the foregoing instances, the second device may receive the error information that is of the Wi-Fi connection and that is sent by the first device through the Bluetooth connection.

After S403, the first device and the second device may perform error tolerance processing for the first communication connection based on the error information. To be specific, after S403, the method in this embodiment of this application may further include S404:

S404: The first device and the second device perform error tolerance processing for the first communication connection based on the error information.

Figure 13:
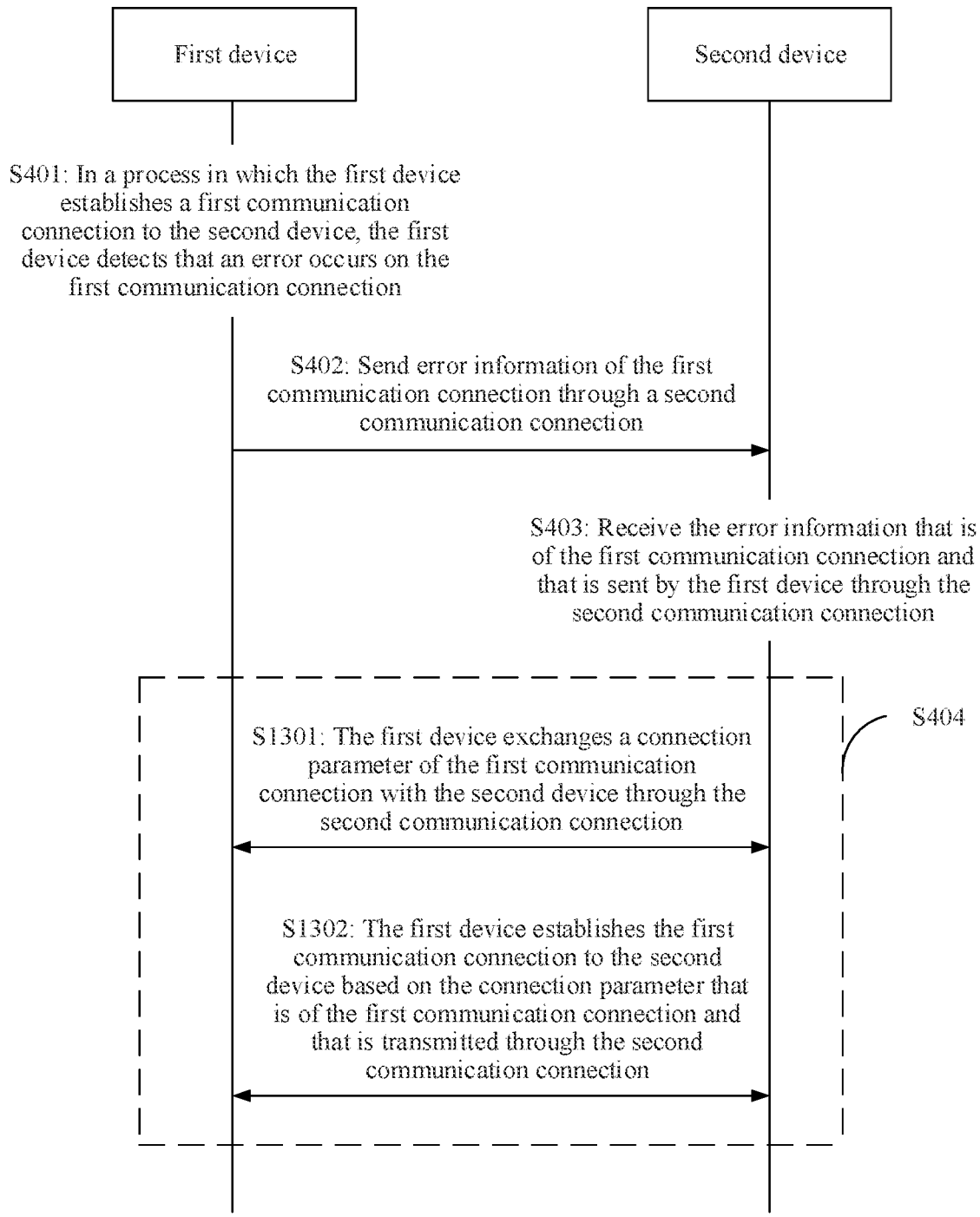
FIG. 13 is a schematic flowchart 4 of a transmission control method according to an embodiment of this application.

In some embodiments of this application, S404 may specifically include S1301 and S1302. For example, as shown in FIG. 13, S404 shown in FIG. 4 may include S1301 and S1302:

S1301: The first device exchanges a connection parameter of the first communication connection with the second device through the second communication connection.

S1302: The first device establishes the first communication connection to the second device based on the connection parameter that is of the first communication connection and that is transmitted through the second communication connection.

In an implementation, after receiving the error information, the second device may proactively request to re-establish the first communication connection to the first device. In this embodiment of this application, the second device may exchange the connection parameter of the first communication connection with the first device through the second communication connection.

For example, it is assumed that the first device is the AP 101, and the second device is the STA 102; and the first communication connection is the Wi-Fi connection, and the second communication connection is the Bluetooth connection. After receiving the error information sent by the AP 101 through the Bluetooth connection, the STA 102 may exchange a connection parameter of the Wi-Fi connection with the AP 101 through the Bluetooth connection.

In this embodiment of this application, the connection parameter of the WI-FI connection may include a WI-FI capability of the STA 102 (for example, the STA 102 supports both WI-FI 5G and WI-FI 2.4G, or the STA 102 supports WI-FI 2.4G), a transmission rate supported by the STA 102, a service set identifier (SSID) of the AP 101, a WI-FI key, and the like.

It should be noted that, that the first communication connection is the Wi-Fi connection and the second communication connection is the Bluetooth connection is used as an example. In this embodiment of this application, the first device may exchange the connection parameter of the Wi-Fi connection with the second device through the Bluetooth connection between the first device and the second device based on a Bluetooth protocol. For a specific manner in which the first device exchanges the connection parameter of the Wi-Fi connection with the second device through the Bluetooth connection based on the Bluetooth protocol, refer to a method for transmitting, by the first device, the error information of the Wi-Fi connection to the second device through the Bluetooth connection based on the Bluetooth protocol. Details are not described in this embodiment of this application.

Figure 14:
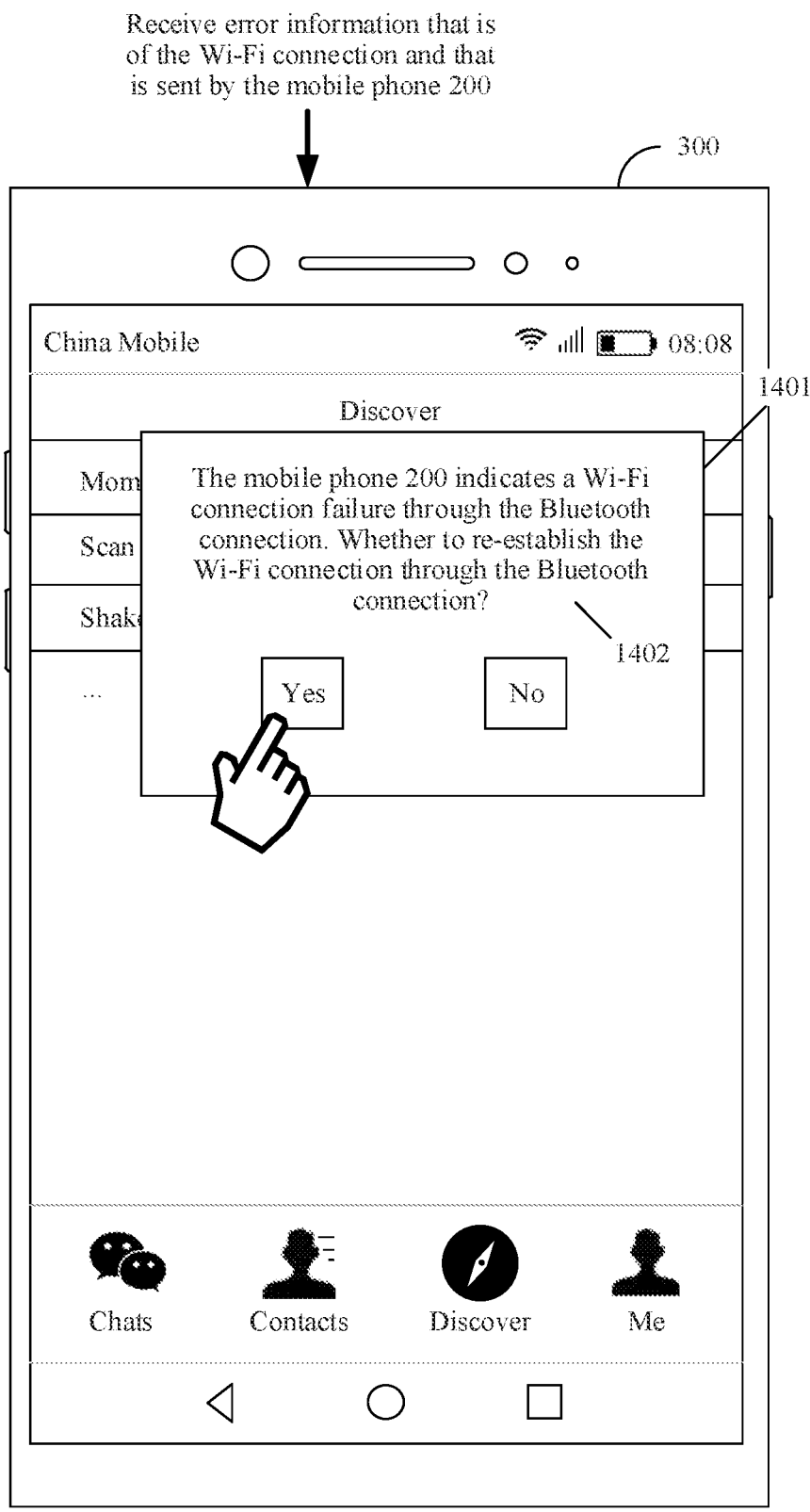
FIG. 14 is a schematic diagram 4 of a display screen according to an embodiment of this application.

Optionally, after S403 (the second device receives the error information), the second device may display a fifth screen. The fifth screen includes third confirmation information. The third confirmation information is used to indicate that the second device receives the error information of the first communication connection through the second communication connection, and request the user to determine whether to re-establish the first communication connection through the second communication connection. For example, it is assumed that a mobile phone 300 is the second device. With reference to any one of FIG. 10 to FIG. 12, as shown in FIG. 14, after receiving error information sent by a mobile phone 200 through a Bluetooth connection, the mobile phone 300 may display a fifth screen 1401 shown in FIG. 14. The fifth screen 1401 includes third confirmation information 1402. For example, the third confirmation information 1402 may be "The mobile phone 200 indicates a Wi-Fi connection failure through the Bluetooth connection. Whether to re-establish the Wi-Fi connection through the Bluetooth connection?" The mobile phone 300 receives a user's tap operation (for example, a tap operation) on a "Yes" button on the fifth screen 1401. In response to the tap operation, the mobile phone 300 may exchange a connection parameter of the Wi-Fi connection with the mobile phone 200 through the Bluetooth connection, and re-establish the Wi-Fi connection.

Figure 10:
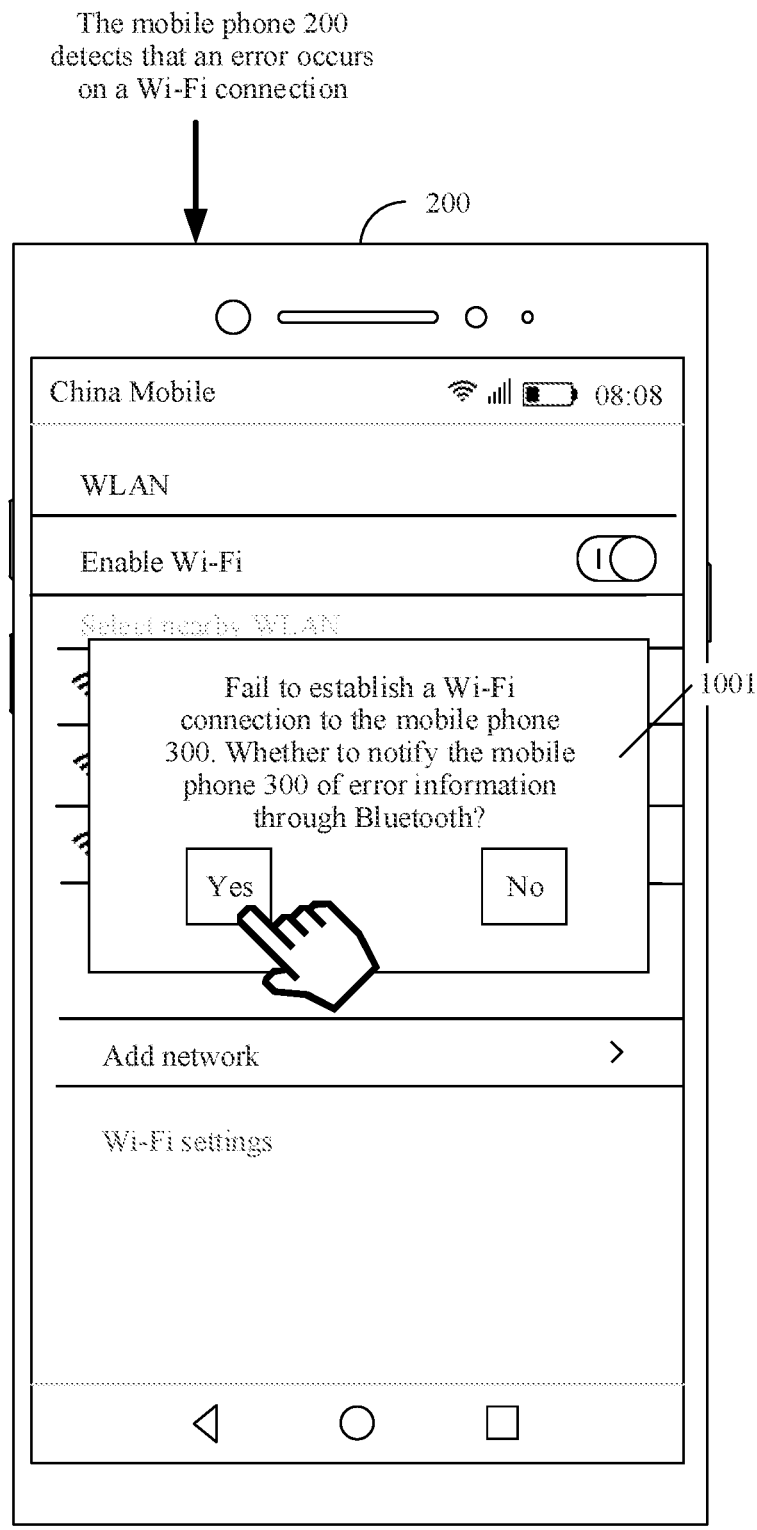
FIG. 10 is a schematic diagram 1 of a display screen according to an embodiment of this application.
Figure 11:
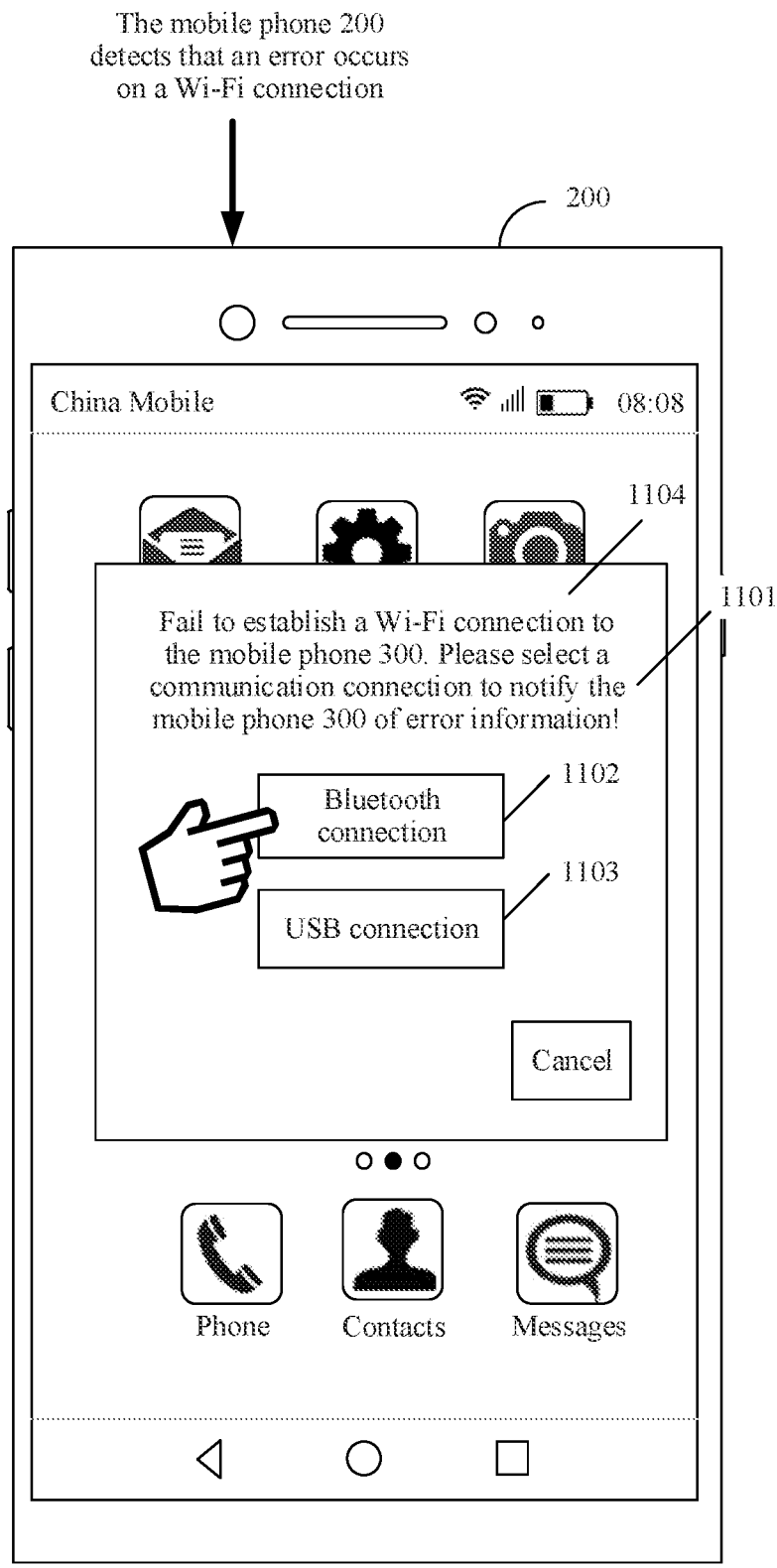
FIG. 11 is a schematic diagram 2 of a display screen according to an embodiment of this application.
Figure 12:
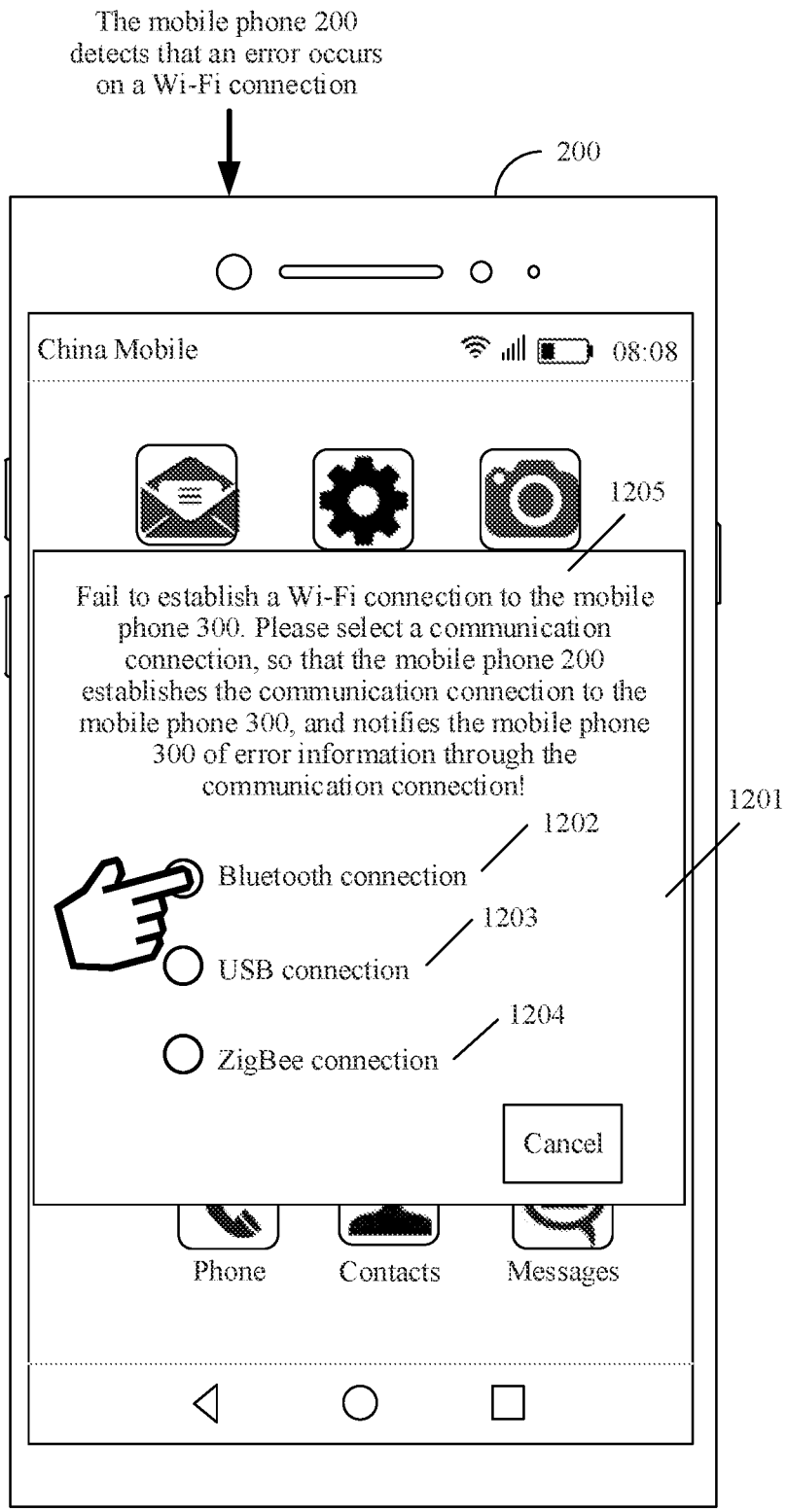
FIG. 12 is a schematic diagram 3 of a display screen according to an embodiment of this application.

In another implementation, in response to detection of the error that occurs on the first communication connection, after sending the error information to the second device through the second communication connection, the first device may further proactively request to re-establish the first communication connection to the second device. For example, it is assumed that the first device is the AP 101, and the second device is the STA 102; and the first communication connection is the Wi-Fi connection, and the second communication connection is the Bluetooth connection. After sending the error information to the STA 102, the AP 101 may further exchange a connection parameter of the Wi-Fi connection with the STA 102 through the Bluetooth connection. For example, as shown in FIG. 10, in response to a users tap operation on a "Yes" button, the mobile phone 200 may further exchange a connection parameter of the Wi-Fi connection with the mobile phone 300 through the Bluetooth connection, and re-establish the Wi-Fi connection. As shown in FIG. 11 or FIG. 12, in response to a user's selection operation on the option for the Bluetooth connection, the mobile phone 200 may further exchange a connection parameter of the Wi-Fi connection with the mobile phone 300 through the Bluetooth connection, and re-establish the Wi-Fi connection.

It may be understood that, after the error occurs on the first communication connection, the first device and the second device may further perform error correction processing based on the error information and a reason of the error that occurs on the first communication connection, to re-establish the first communication connection as quickly as possible. However, it is necessary to take the first device and the second device some time to perform the error correction processing. In this embodiment of this application, after the error occurs on the first communication connection, the first device may exchange the connection parameter of the first communication connection with the second device through the second communication connection. In this case, after correcting the error, the first device may directly re-establish the first communication connection to the second device based on the connection parameter that is of the first communication connection and that is transmitted through the second communication connection. In this way, a time for establishing the first communication connection can be shortened, and efficiency of establishing the first communication connection can be improved.

According to the transmission control method provided in this embodiment of this application, after detecting that the error occurs on the first communication connection, the first device may send the error information of the first communication connection to the second device through the second communication connection. The first device sends the error information of the first communication connection to the second device in time, so that the second device can sense in time that the error occurs on the first communication connection. In addition, after the error occurs on the first communication connection, the first device may exchange the connection parameter of the first communication connection with the second device through the second communication connection, and then directly re-establish the first communication connection to the second device based on the connection parameter. In this way, a time for establishing the first communication connection can be shortened, and efficiency of establishing the first communication connection can be improved.

In a second application scenario of an embodiment of this application, a first device has established a first communication connection to the second device. A transmission control method provided in this embodiment of this application may be applied to a process in which the first device sends/receives data to/from the second device through the first communication connection. For example, the method in this embodiment of this application may be applied to a mobile phone clone scenario. For example, the first communication connection is a Wi-Fi connection. In the mobile phone clone scenario, a mobile phone 1 (namely, the first device) may send/receive clone information (namely, first data) to/from a mobile phone 2 (namely, the second device) through the Wi-Fi connection. The clone information (namely, the first data) may include various communication data, SMS messages, WeChat information, photos, contacts, and the like in the mobile phone 1. In a process in which the mobile phone 1 sends/receives the clone information to/from the mobile phone 2 through the Wi-Fi connection, if an error occurs on the Wi-Fi connection, the mobile phone 1 may exchange error information of the first communication connection with the mobile phone 2 through a second communication connection (for example, a Bluetooth connection), and the mobile phone 1 may continue to send/receive the clone information to/from the mobile phone 2 through the second communication connection (for example, the Bluetooth connection). The mobile phone 1 may further exchange a connection parameter of the Wi-Fi connection with the mobile phone 2 through the second communication connection (for example, the Bluetooth connection), to re-establish the Wi-Fi connection.

For example, the first communication connection may be the Wi-Fi connection. The first device may be the STA 102, and the second device may be the AP 101. Alternatively, the first device may be the AP 101, and the second device may be the STA 102. Alternatively, the first device may be the STA 102, and the second device may be the STA 103. The STA 102 may send/receive data to/from the STA 103 by using a Wi-Fi network provided by the AP 101.

Figure 15:
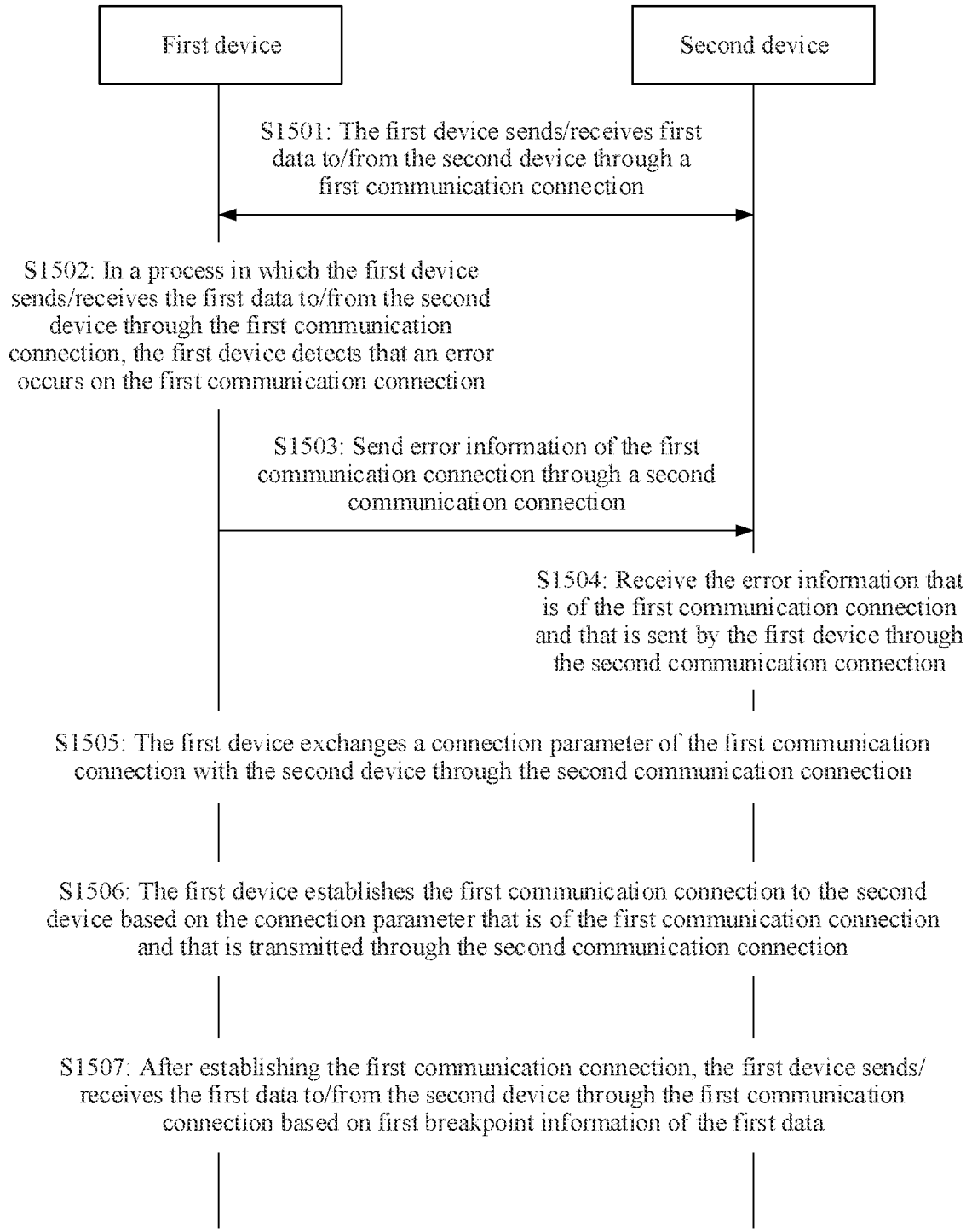
FIG. 15 is a schematic flowchart 5 of a transmission control method according to an embodiment of this application.

An embodiment of this application provides a transmission control method. As shown in FIG. 15, the transmission control method may include S1501 to S1507.

S1501: A first device sends/receives first data to/from a second device through a first communication connection.

For example, in this embodiment of this application, the first data may be in a plurality of data forms such as a file, signaling, or a message. A specific form of the first data is not limited in this embodiment of this application.

S1502: In a process in which the first device sends/receives the first data to/from the second device through the first communication connection, the first device detects that an error occurs on the first communication connection.

The first device may be a receive end of the first data, or may be a transmit end of the first data. For example, when the first device is the receive end of the first data, if the first device detects that a garble occurs on the received first data, the first device may check whether the error occurs on the first communication connection.

In an implementation, it is assumed that the first device is the STA 102, the second device is the AP 101, and the first communication connection is a Wi-Fi connection. An error that occurs on the Wi-Fi connection may be caused by a fault occurring on the AP 101. The fault occurring on the AP 101 may include at least the foregoing Case (1), Case (2), and Case (3). Optionally, that the AP 101 is faulty may further include: The AP 101 is powered off. Alternatively, an error that occurs on the Wi-Fi connection may be caused by a fault occurring on the STA 102. The fault occurring on the STA 102 may include at least the foregoing Case (4).

In another implementation, it is assumed that the first device is the AP 101, the second device is the STA 102, and the first communication connection is a Wi-Fi connection. An error that occurs on the Wi-Fi connection may be caused by a fault occurring on the AP 101. The fault occurring on the AP 101 may include at least the foregoing Case (5), Case (6), and Case (7). Alternatively, an error that occurs on the Wi-Fi connection may be caused by a fault occurring on the STA 102. The fault occurring on the STA 102 side may include at least the foregoing Case (8).

In another implementation, it is assumed that the first device is the STA 103, the second device is the STA 102, and the first communication connection is a Wi-Fi connection. An error that occurs on the Wi-Fi connection may be caused by a fault occurring on the AP 101. When the AP 101 is faulty, the AP 101 cannot provide a Wi-Fi network for the STA 103 and the STA 102, and consequently the error occurs on the Wi-Fi connection and transmission of the first data is abnormal.

S1503: The first device sends error information of the first communication connection to the second device through a second communication connection.

For a detailed description of S1503, refer to the related description of S402 in the foregoing embodiment. Details are not described in this embodiment of this application again.

In an implementation, before S1502, a function of the second communication connection (for example, a Bluetooth connection) on the second device is enabled. In another implementation, after S1502 and before S1503, the method in this embodiment of this application may further include S501 or S601. Detailed descriptions of S501 and S601 are not described in this embodiment of this application again.

Optionally, in this embodiment of this application, the second communication connection may be a communication connection that is in possible communication connections between the first device and the second device other than the first communication connection and that meets a preset condition. After detecting that the error occurs on the first communication connection, the first device may select, from the possible communication connections between the first device and the second device other than the first communication connection, the communication connection that meets the preset condition.

It should be noted that, for a method for selecting the second communication connection by the first device, refer to detailed descriptions in the first application scenario. Details are not described in this embodiment of this application again.

S1504: The second device receives the error information that is of the first communication connection and that is sent by the first device through the second communication connection.

For a detailed description of S1504, refer to the related description of S403 in the foregoing embodiment. Details are not described in this embodiment of this application again.

After S1504, in some embodiments, the first device may exchange a connection parameter of the first communication connection with the second device through the second communication connection, to re-establish the first communication connection. Specifically, after S1504, the method in this embodiment of this application may further include S1505 to S1507.

S1505: The first device exchanges the connection parameter of the first communication connection with the second device through the second communication connection.

S1506: The first device establishes the first communication connection to the second device based on the connection parameter that is of the first communication connection and that is transmitted through the second communication connection.

For detailed descriptions of S1505 and S1506, refer to the related descriptions of S1301 and S1302 in the foregoing embodiment. Details are not described in this embodiment of this application again.

S1507: After establishing the first communication connection, the first device sends/receives the first data to/from the second device through the first communication connection based on first breakpoint information of the first data.

Optionally, the error information may further include the first breakpoint information of the first data. The first breakpoint information of the first data is used to indicate an end location at which data in the first data has been correctly sent/received by the first device to/from the second device. For example, the first breakpoint information of the first data may be an identifier of data that is in the first data and that has been correctly sent/received recently. The data that is in the first data and that has been correctly sent/received recently is latest data that is in the first data and that has been correctly sent/received before the error occurs on the first communication connection. In this way, the first device can continue to send/receive the first data to/from the second device through the first communication connection based on the first breakpoint information of the first data.

According to the transmission control method provided in this embodiment of this application, after detecting that the error occurs on the first communication connection, the first device may send the error information of the first communication connection to the second device through the second communication connection. The first device sends the error information of the first communication connection to the second device in time, so that the second device can sense in time that the error occurs on the first communication connection. In addition, after the error occurs on the first communication connection, the first device may exchange the connection parameter of the first communication connection with the second device through the second communication connection, and then directly re-establish the first communication connection to the second device based on the connection parameter. In this way, a time for establishing the first communication connection can be shortened, and efficiency of establishing the first communication connection can be improved.

In some other embodiments, to improve efficiency of sending/receiving the first data, in a process in which S1505 and S1506 are performed, the first device may continue to directly send/receive the first data to/from the second device through the second communication connection based on the first breakpoint information of the first data. Specifically, as shown in FIG. 16A, after S1504, the method in this embodiment of this application may further include S1505, S1506, and S1601.

S1601: The first device continues to send/receive the first data to/from the second device through the second communication connection based on the first breakpoint information of the first data.

Figure 16A:
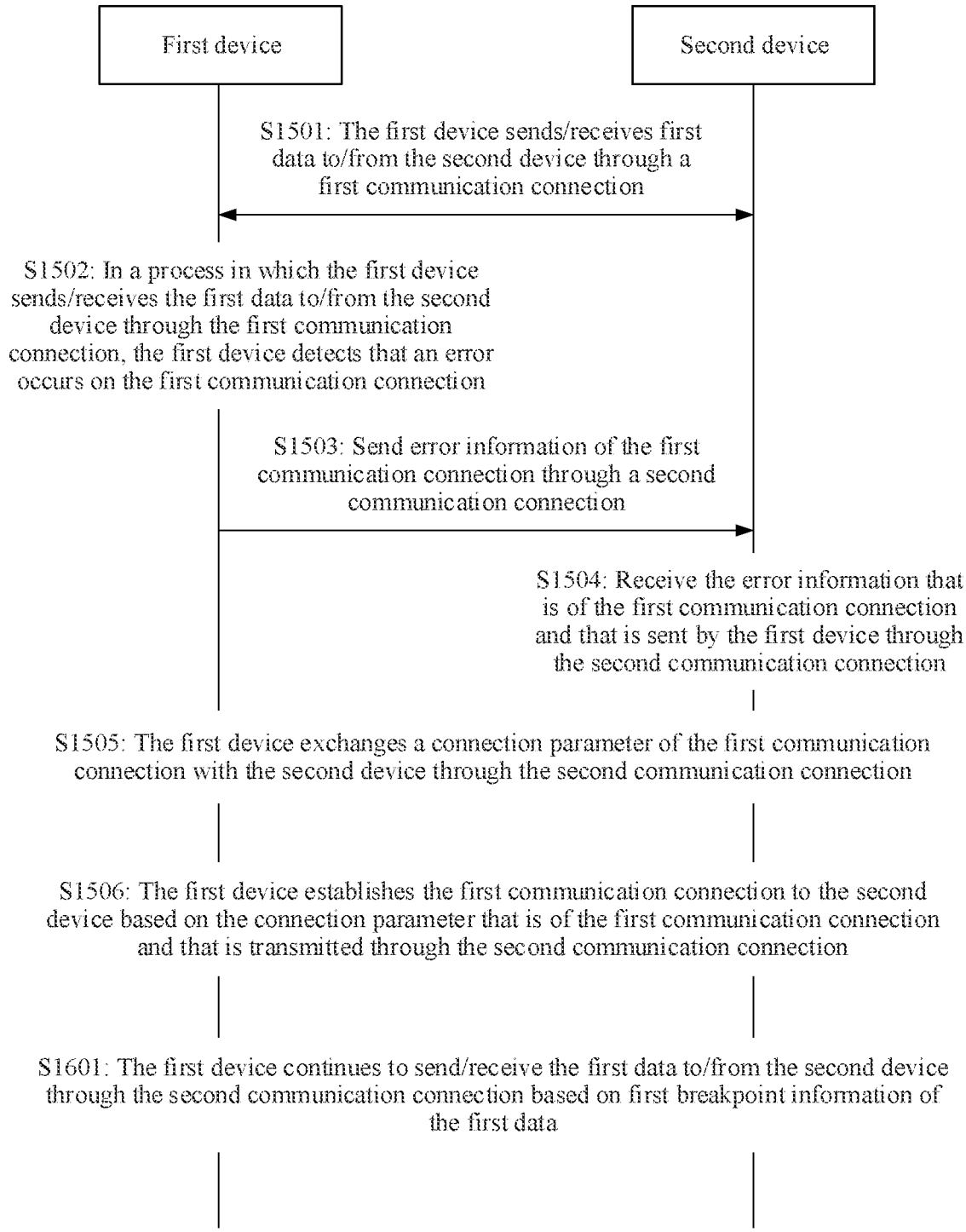
FIG. 16A is a schematic flowchart 6 of a transmission control method according to an embodiment of this application.

It should be noted that, in the solution shown in FIG. 16A, S1505, S1506, and S1601 are all performed between the first device and the second device.

Figure 16B:
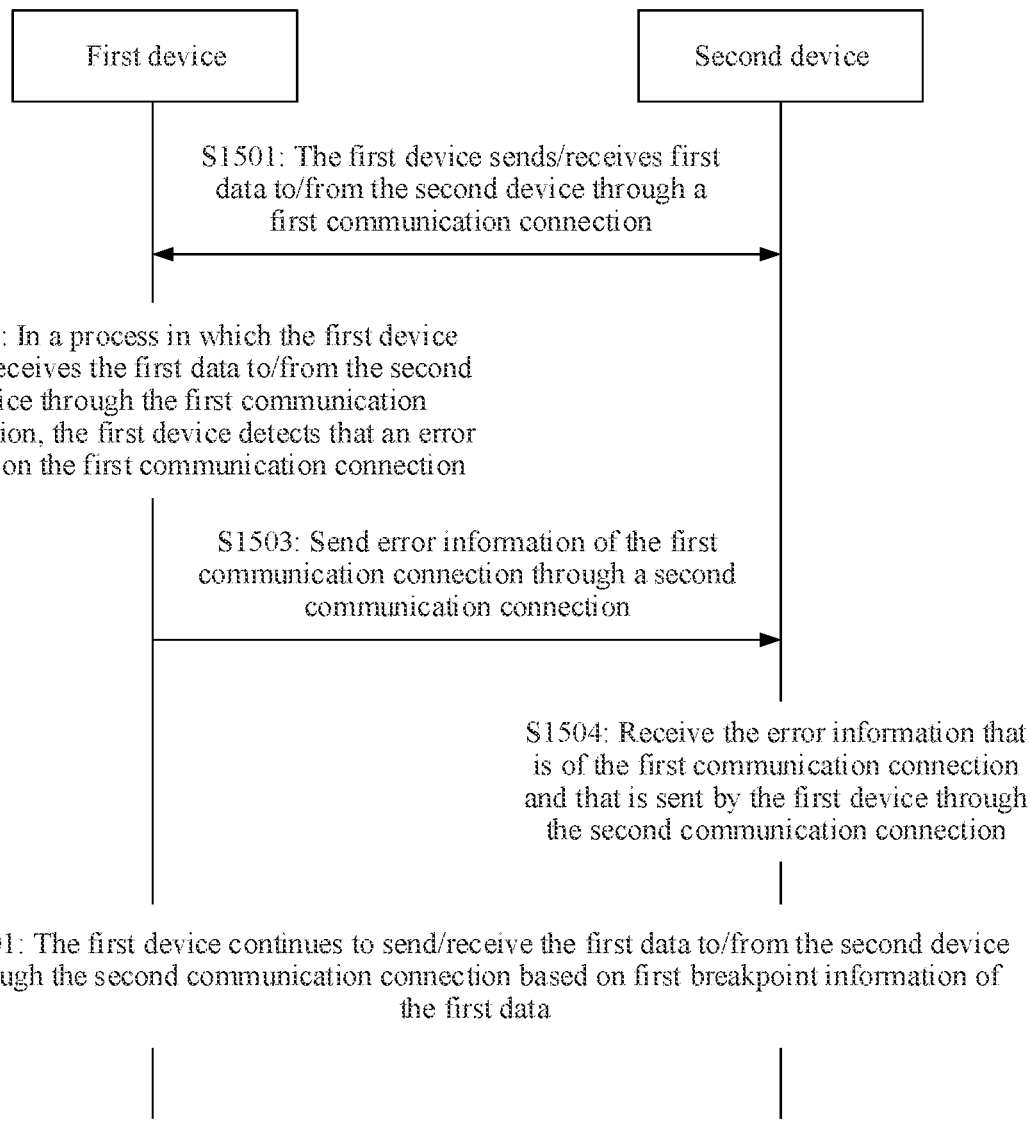
FIG. 16B is a schematic flowchart 7 of a transmission control method according to an embodiment of this application.

In some other embodiments, after S1504, the first device may directly continue to send/receive the first data to/from the second device through the second communication connection. In this case, in this embodiment of this application, after S1504, S1505 to S1507 may not be performed, but S1601 is directly performed between the first device and the second device. Specifically, as shown in FIG. 16B, after S1504, the method in this embodiment of this application may further include S1601.

According to the transmission control method provided in this embodiment of this application, after detecting that the error occurs on the first communication connection, the first device may send the error information of the first communication connection to the second device through the second communication connection. The first device sends the error information of the first communication connection to the second device in time, so that the second device can sense in time that the error occurs on the first communication connection. In addition, after the error occurs on the first communication connection, the first device may continue to directly send/receive the first data to/from the second device through the second communication connection based on the first breakpoint information of the first data.

For example, the first communication connection is a Wi-Fi connection, and the second communication connection is a Bluetooth connection. It may be understood that, when the first device has established the Bluetooth connection to the second device, because it is necessary to take the first device some time to re-establish the Wi-Fi connection to the second device, the first device sends/receives the first data to/from the second device through the Bluetooth connection. Therefore, sending/receiving the first data can be quickly completed, and efficiency of sending/receiving the first data can be improved. When the first device has not established the Bluetooth connection to the second device, because it is necessary to take the first device some time to re-establish the Wi-Fi connection to the second device, and a time required for establishing the Bluetooth connection is shorter than the time required for establishing the Wi-Fi connection, the first device sends/receives the first data to/from the second device through the Bluetooth connection. Therefore, sending/receiving the first data can be quickly completed, and efficiency of sending/receiving the first data can be improved.

Optionally, in this embodiment of this application, after S1504, the first device or the second device may determine, based on a preset policy, to continue to perform S1505 to S1507, or S1601, or S1505, S1506, and S1601. A method for determining, by the first device or the second device based on the preset policy, to perform the foregoing steps may include the following: The first device or the second device determines, based on at least one of a service type of the first data, a data volume of the first data, and an available resource, to perform the foregoing steps. The available resource may include an available communication connection between the first device and the second device.

The service type of the first data may indicate that the first data is video data, audio data, text data, or the like. Data with different service types has different delay requirements. For example, in a process in which a user watches a video by using a Wi-Fi network, the first data is the video data. To ensure user experience in video watching, the video data has a relatively high delay requirement. For example, a requirement of the video data for a delay is higher than a requirement of the text data for a delay. Therefore, when the first data is the video data, to ensure that the video data is sent/received continuously without interruption, after S1504, S1601 may be directly performed between the first device and the second device. To be specific, the first device continues to send/receive the first data to/from the second device through the second communication connection based on the first breakpoint information of the first data.

Alternatively, when the first data is the video data, to ensure that the video data is sent/received continuously without interruption, after S1504, S1505, S1506, and S1601 may be performed between the first device and the second device. To be specific, the first device may send/receive the video data to/from the second device through the Bluetooth connection while re-establishing the Wi-Fi connection to the second device.

When the first data has a relatively low delay requirement, the first device may continue to send/receive the first data to/from the second device through the re-established Wi-Fi connection after the Wi-Fi connection is re-established. To be specific, after S1504, S1505 to S1507 may be performed between the first device and the second device.

Figure 17:
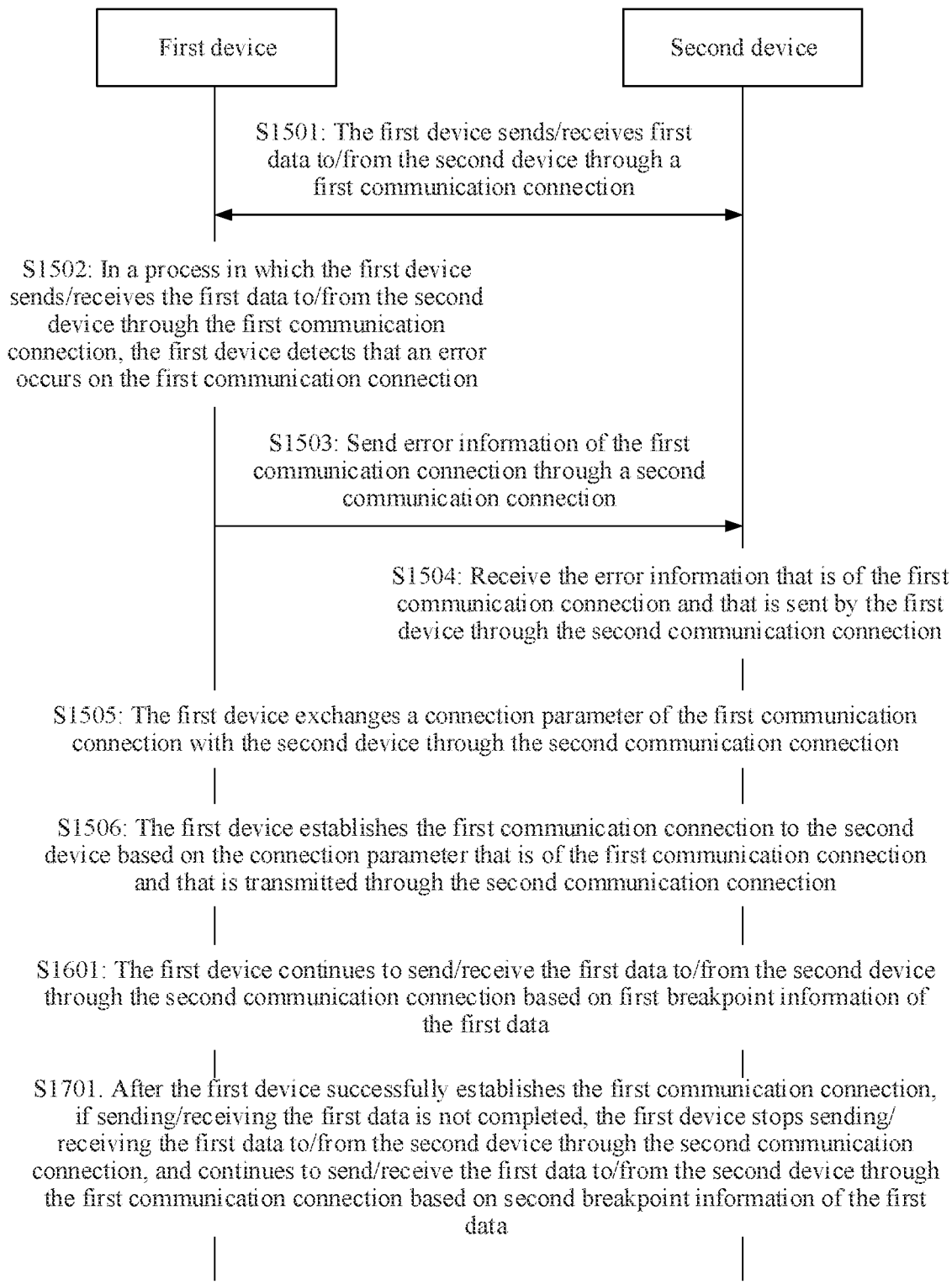
FIG. 17 is a schematic flowchart 8 of a transmission control method according to an embodiment of this application.

Optionally, considering that a transmission rate through the first communication connection may be higher than a transmission rate through the second communication connection, after successfully establishing the first communication connection, the first device may continue to send/receive the first data to/from the second device through the first communication connection. To be specific, as shown in FIG. 17, after S1505, S1506, and S1601 shown in FIG. 16A are performed, the method in this embodiment of this application may further include S1701:

S1701: After the first device successfully establishes the first communication connection, if sending/receiving the first data is not completed, the first device stops sending/receiving the first data to/from the second device through the second communication connection, and continues to send/receive the first data to/from the second device through the first communication connection based on second breakpoint information of the first data.

Optionally, S1701 may be replaced with the following: After the first device successfully establishes the first communication connection, if sending/receiving the first data is not completed, and a transmission rate through the first communication connection is higher than a transmission rate through the second communication connection, the first device stops sending/receiving the first data to/from the second device through the second communication connection, and continues to send/receive the first data to/from the second device through the first communication connection based on second breakpoint information of the first data.

The second breakpoint information may be transmitted between the first device and the second device through the second communication connection. The second breakpoint information is used to indicate an end location at which data in the first data has been correctly sent/received by the first device to/from the second device in the process in which the first data is sent/received through the second communication connection.

For example, based on the foregoing instances, after the Wi-Fi connection is re-established between the first device and the second device, if sending/receiving the video data is not completed, the first device may stop sending/receiving the video data to/from the second device through the Bluetooth connection, and the first device may continue to send/receive the video data to/from the second device through the Wi-Fi connection based on second breakpoint information of the video data.

Optionally, after a terminal successfully establishes the first communication connection, if sending/receiving the first data is not completed, the terminal may determine whether an amount of data that is in the first data and that has not been sent/received is greater than a preset data amount threshold. When the amount of data that has not been sent/received is greater than the preset data amount threshold, the terminal may stop sending/receiving the first data through the second communication connection, and continue to send/receive the first data through the first communication connection. When the amount of data that has not been sent/received is less than or equal to the preset data amount threshold, the terminal may continue sending/receiving the first data through the second communication connection. A data amount of the first data may indicate a size of the first data. When the data amount of the first data is relatively small, the first device may send/receive the first data to/from the second device through the Bluetooth connection until sending/receiving the first data is completed. Even if the Wi-Fi connection is re-established, the first data does not need to be sent/received through the re-established Wi-Fi connection.

The available resource may include an available communication connection between the first device and the second device. For example, when there is no other available communication connection between the first device and the second device than the first communication connection (for example, the Wi-Fi connection), or no other available communication connection can be established, after re-establishing the Wi-Fi connection, the first device continues to send/receive the first data to/from the second device through the re-established Wi-Fi connection. To be specific, after S1504, S1505 to S1507 may be performed between the first device and the second device.

Optionally, in this embodiment of this application, a user may determine whether to continue to perform S1505 to S1507, or S1601, or S1505, S1506, and S1601 after S1504 between the first device and the second device.

In an implementation, a user of the first device may determine whether to continue to perform S1505 to S1507, or S1601, or S1505, S1506, and S1601 after S1504 between the first device and the second device. In response to detecting that the error occurs on the first communication connection, the first device may display a second screen when performing S1503. The second screen includes first confirmation information. The first confirmation information is used to indicate that the error occurs on the first communication connection, and request the user to determine to "Re-establish the first communication connection, and transmit the first data through the re-established first communication connection" or "Transmit the first data through the second communication connection".

Figure 18:
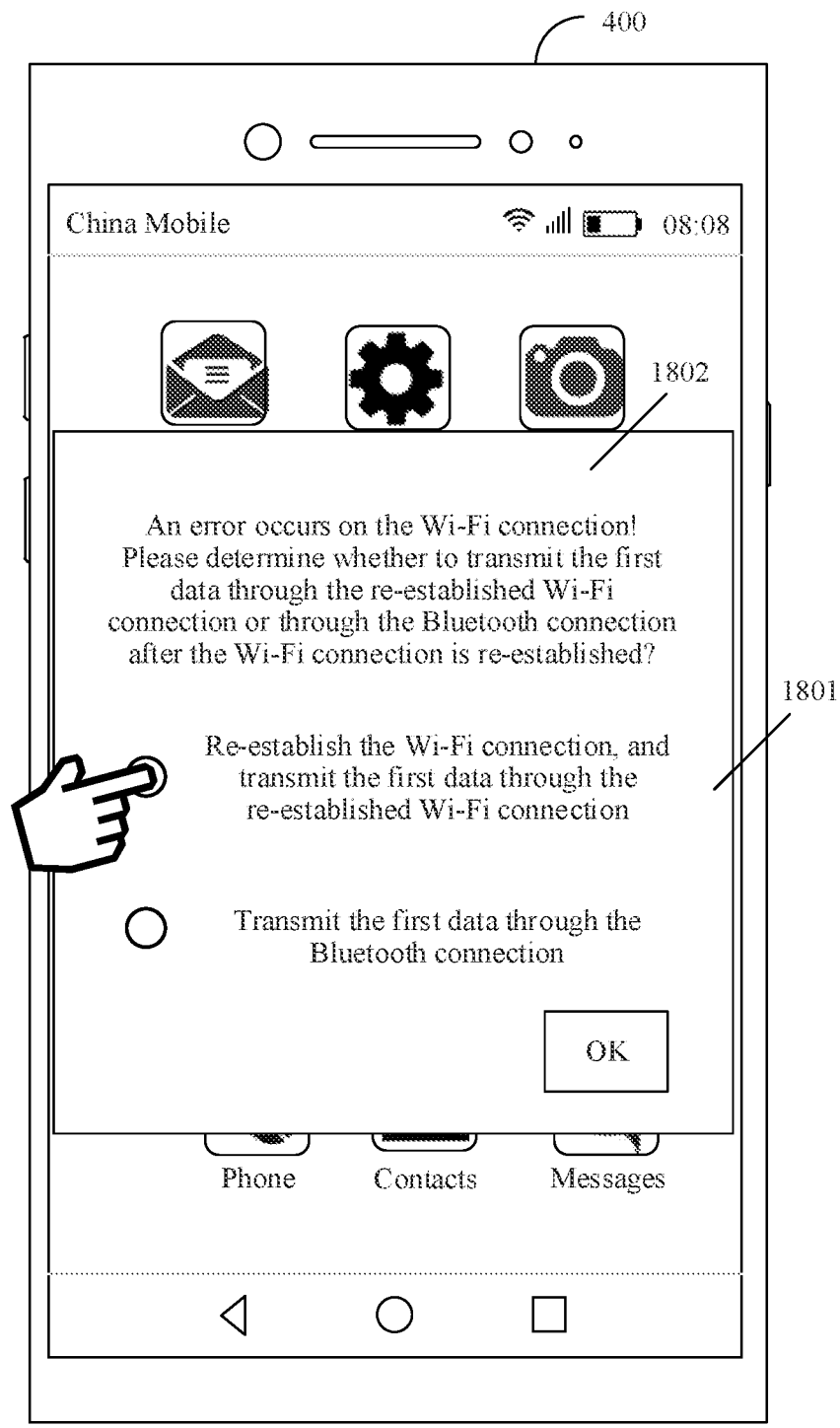
FIG. 18 is a schematic diagram 5 of a display screen according to an embodiment of this application.

For example, it is assumed that the first device is a mobile phone 400, the first communication connection is a Wi-Fi connection, and the second communication connection is a Bluetooth connection. In response to detecting that an error occurs on the Wi-Fi connection, the mobile phone 400 may display a second screen 1801 shown in FIG. 18 when performing S1503. The second screen 1801 includes first confirmation information 1802. The first confirmation information 1802 may be "An error occurs on the Wi-Fi connection! Please determine whether to transmit the first data through the re-established Wi-Fi connection or through the Bluetooth connection after the Wi-Fi connection is re-established?"

In another implementation, a user of the second device may determine whether to continue to perform S1505 to S1507, or S1601, or S1505, S1506, and S1601 after S1504 between the first device and the second device. In response to receiving the error information of the first communication connection, the second device may display a second screen. The second screen includes first confirmation information. The first confirmation information is used to indicate that the error occurs on the first communication connection, and request the user to determine to "Re-establish the first communication connection, and transmit the first data through the re-established first communication connection" or "Transmit the first data through the second communication connection". For example, it is assumed that the second device is a mobile phone 400, the first communication connection is a Wi-Fi connection, and the second communication connection is a Bluetooth connection. After receiving error information of the Wi-Fi connection, the mobile phone 400 may display a second screen 1801 shown in FIG. 18. The second screen 1801 includes first confirmation information 1802. The first confirmation information 1802 may be "An error occurs on the Wi-Fi connection! Please determine whether to transmit the first data through the re-established Wi-Fi connection or through the Bluetooth connection after the Wi-Fi connection is re-established?" In response to a user's selection operation on an option "Re-establish the Wi-Fi connection, and transmit the first data through the re-established Wi-Fi connection" shown in FIG. 18, the mobile phone 400 may perform S1505 to S1507. In response to a user's selection operation on an option "Transmit the first data through the Bluetooth connection" shown in FIG. 18, the mobile phone 400 may perform S1505, S1506, and S1601, or may perform S1601.

Figure 19:
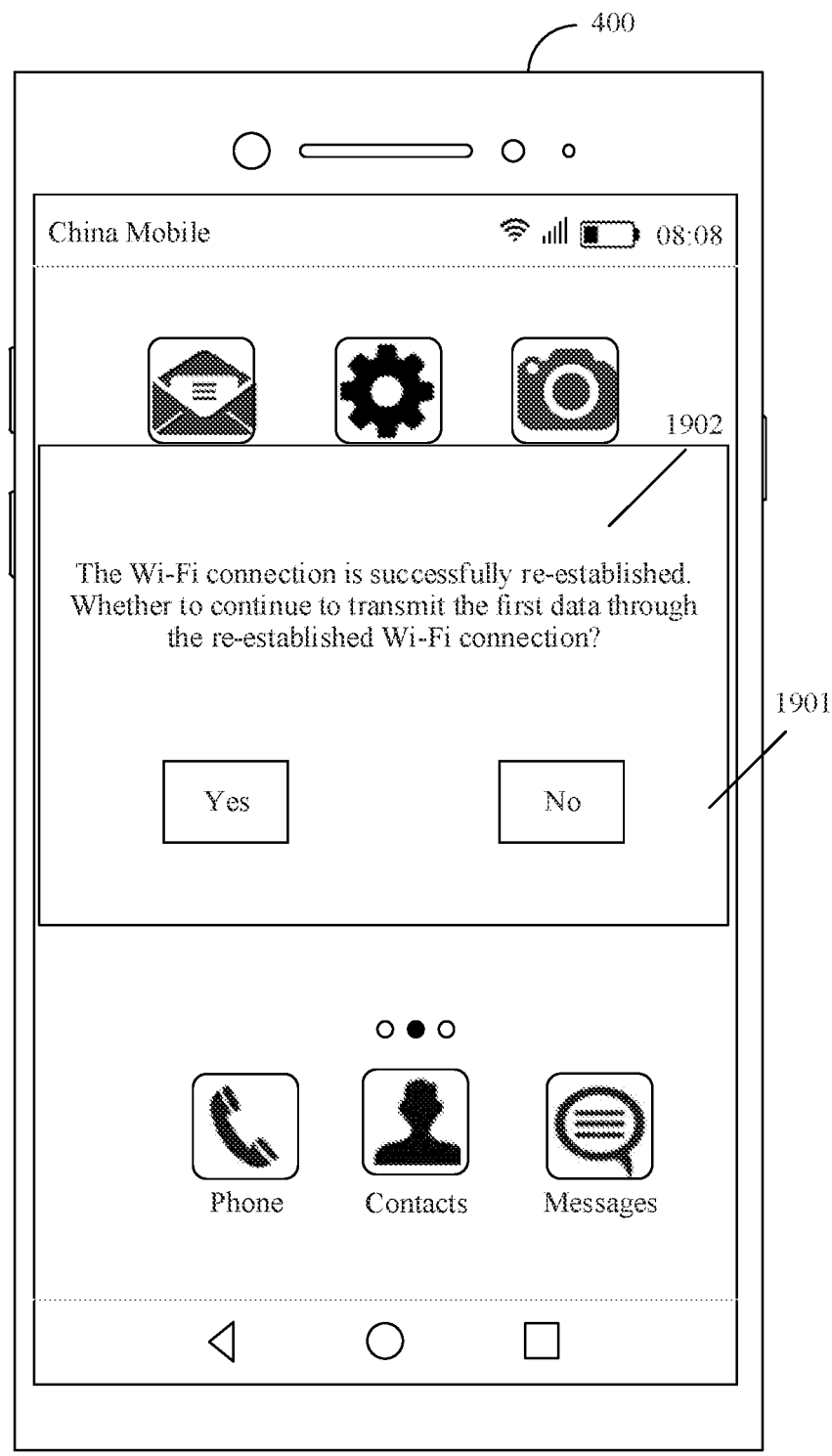
FIG. 19 is a schematic diagram 6 of a display screen according to an embodiment of this application.

Optionally, if the user selects "Transmit the first data through the Bluetooth connection", after the mobile phone 400 successfully re-establishes the Wi-Fi connection, if sending/receiving the first data is not completed, the mobile phone 400 may further display a fourth screen 1901. The fourth screen 1901 includes second confirmation information 1902. The second confirmation information 1902 is used to indicate "The Wi-Fi connection is successfully re-established. Whether to continue to transmit the data through the re-established Wi-Fi connection?". In response to a user's tap operation on a "Yes" button shown in FIG. 19, the mobile phone 400 may stop sending/receiving the first data through the Bluetooth connection, and continue to send/receive the first data through the Wi-Fi connection based on the second breakpoint information of the first data. In response to a user's tap operation on a "No" button shown in FIG. 19, the mobile phone 400 may continue sending/receiving the first data through the Bluetooth connection.

It should be noted that the first device may send/receive the first data to/from the second device through the Bluetooth connection between the first device and the second device based on a Bluetooth protocol. For a specific manner in which the first device sends/receives the first data to/from the second device through the Bluetooth connection based on the Bluetooth protocol, refer to a method for sending, by the first device, the error information of the Wi-Fi connection to the second device through the Bluetooth connection based on the Bluetooth protocol. Details are not described in this embodiment of this application.

The transmission control method provided in this embodiment of this application not only can improve efficiency of establishing the first communication connection, but also can improve efficiency of sending/receiving the first data. In addition, in response to user's selection of a transmission manner for the first data, the first device or the second device may further complete sending/receiving of the first data through the communication connection selected by the user. In this way, performance of interaction between the device and the user can be improved.

It may be understood that to implement the foregoing functions, the first device and the second device include corresponding hardware structures and/or software modules for performing the functions. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, the device may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in this embodiment of this application, division into the modules is an example, is merely a logical function division, and may be other division in an actual implementation.

Figure 20:
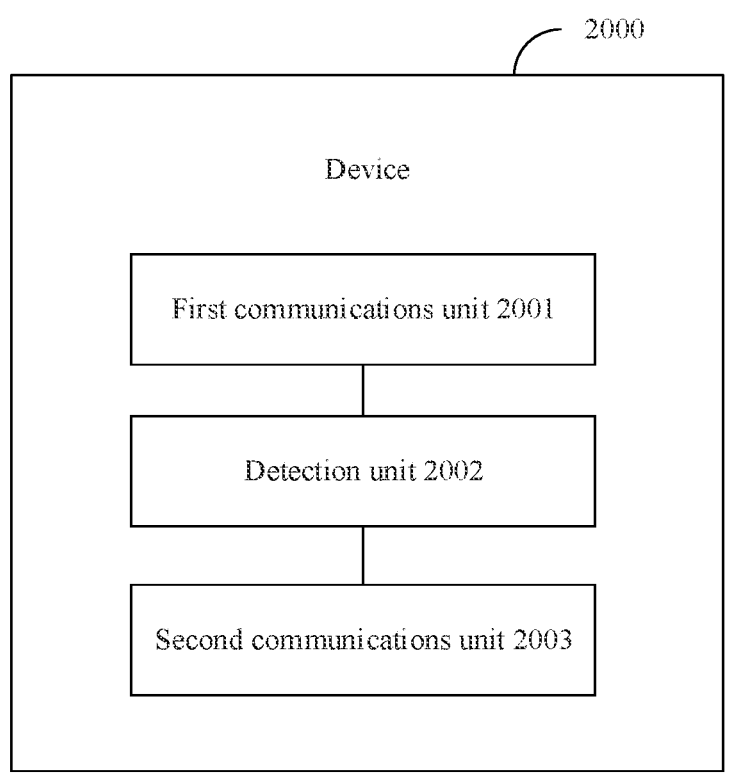
FIG. 20 is a schematic structural composition diagram 1 of a device according to an embodiment of this application.

When each functional module is obtained through division based on each corresponding function, as shown in FIG. 20, an embodiment of this application provides a device 2000. The device 2000 includes a first communications unit 2001, a detection unit 2002, and a second communications unit 2003.

The first communications unit 2001 is configured to support the device 2000 to perform S301, S303, S305, S1501, and S507 in the foregoing method embodiments, and/or is configured to perform another process of the technology described in this specification.

The detection unit 2002 is configured to support the device 2000 to perform S401 and S1502 in the foregoing method embodiments, and/or is configured to perform another process of the technology described in this specification.

The second communications unit 2003 is configured to support the device 2000 to perform S402, S1301, S1503, S1505, and S1601 in the foregoing method embodiments, and/or is configured to perform another process of the technology described in this specification.

Figure 21:
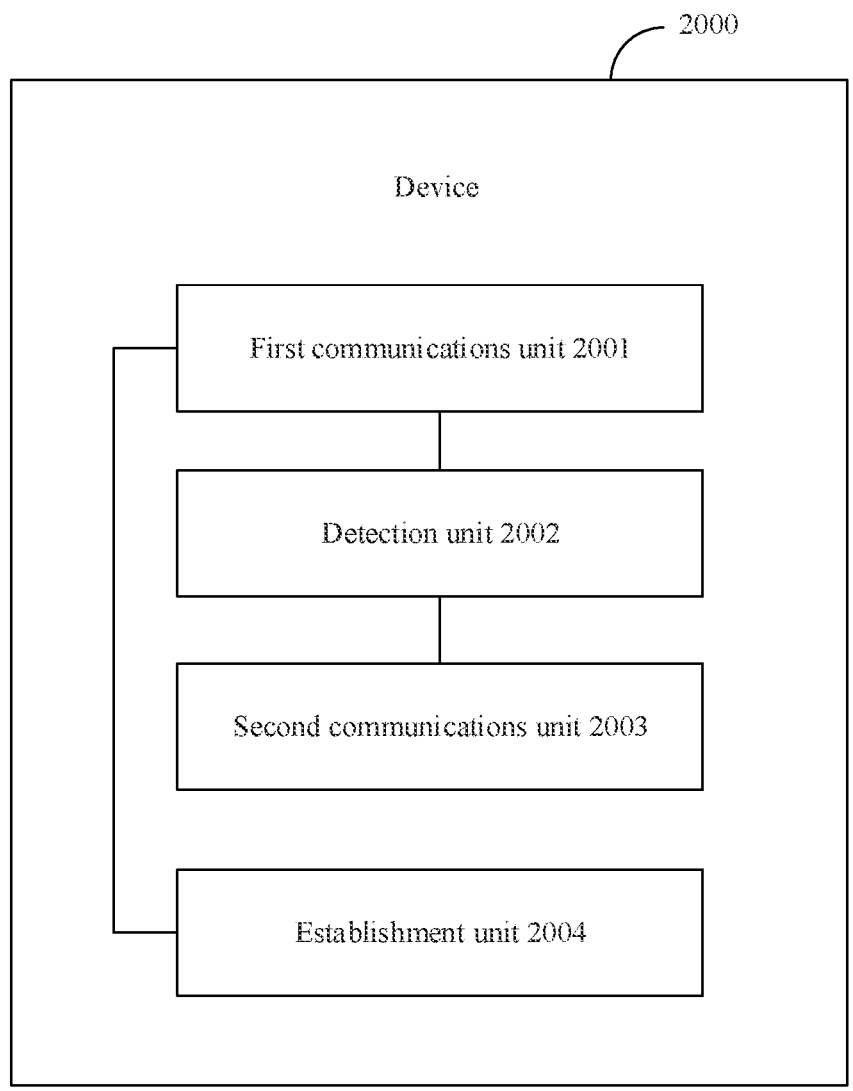
FIG. 21 is a schematic structural composition diagram 2 of a device according to an embodiment of this application.

Further, as shown in FIG. 21, the device 2000 may further include an establishment unit 2004. The establishment unit 2004 is configured to support the device 2000 to establish a first communication connection and a second communication connection to the second device. Specifically, the establishment unit 2004 is configured to support the device 2000 to perform S501, S601, S1302, and S1506 in the foregoing method embodiments, and/or is configured to perform another process of the technology described in this specification.

Further, the device 2000 may further include a control unit. The control unit is configured to support the device 2000 to perform the operation of controlling the second communications unit 2003 to "stop sending/receiving the first data through the second communication connection" in S404 and S1701 in the foregoing method embodiments, and/or is configured to perform another process of the technology described in this specification.

Further, the device 2000 may further include a selection unit. The selection unit is configured to support the device 2000 to select the second communication connection from one or more communication connections, and/or is used in another process of the technology described in this specification.

Further, the device 2000 may further include a prompting unit. The prompting unit is configured to support the device 2000 to provide first prompt information, and/or is configured to perform another process of the technology described in this specification.

Further, the device 2000 may further include a display unit and a determining unit. The display unit is configured to support the device 2000 to display a first screen, a third screen, a second screen, a fourth screen, and the like, and/or is configured to perform another process of the technology described in this specification. The determining unit is configured to support the device 2000 to determine, in response to a user's selection operation on an option for a communication connection displayed by the display unit, a communication connection selected by the user as the second communication connection, and/or is configured to perform another process of the technology described in this specification.

Certainly, the functional units of the device 2000 include but are not limited to the foregoing units. For example, the device 2000 may further include a storage unit.

Figure 22:
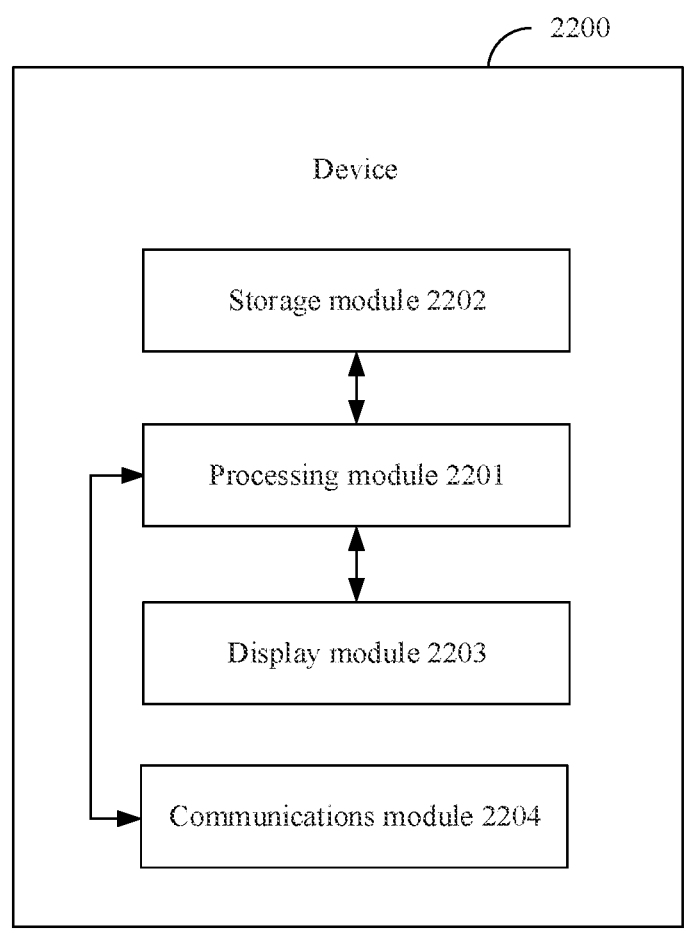
FIG. 22 is a schematic structural composition diagram 3 of a device according to an embodiment of this application.

When an integrated unit is used, the first communications unit 2001 and the second communications unit 2003 may be integrated into one communications module for implementation. The detection unit 2002, the establishment unit 2004, the control unit, the selection unit, the prompting unit, and the determining unit may be implemented by using one processing module. The display unit may be a display module. The storage unit may be a storage module. FIG. 22 is a schematic diagram of a possible structure of the device in the foregoing embodiment of this application. The device 2200 includes a processing module 2201, a storage module 2202, a display module 2203, and a communications module 2204.

The processing module 2201 is configured to control and manage the device 2200. The display module 2203 is configured to display a screen and receive a user's touch operation. The storage module 2202 is configured to store program code and data of the device 2200. The communications module 2204 is configured to communicate with another device. For example, the communications module is configured to receive or send information from or to another device.

The processing module 2201 may be a processor or a controller, for example, may include a central processing unit (CPU) and a graphics processing unit (GPU), a general purpose processor, a digital signal processor (DSP), an application-specific integrated circuit (ASIC), a field-programmable gate array (FPGA) or another programmable logic device, a transistor logic device, a hardware component, or any combination thereof. The processing module 2201 may implement or execute various example logical blocks, modules, and circuits described with reference to content disclosed in this application. The processor may be a combination of processors implementing a computing function, for example, a combination of one or more microprocessors, or a combination of the DSP and a microprocessor. The communications module may be a transceiver, a transceiver circuit, a communications interface, or the like. The storage module 2202 may be a memory.

When the processing module 2201 is a processor (for example, the processor 201 shown in FIG. 2), the communications module is a radio frequency circuit (for example, the radio frequency circuit 202 shown in FIG. 2), the storage module 2202 is a memory (for example, the memory 203 shown in FIG. 2), and the display module 2203 is a display (including the display 204 shown in FIG. 2 and including the touchpad 204-1 and the display panel 204-5), the device provided in this application may be the mobile phone 200 shown in FIG. 2. The communications module may not only include the radio frequency circuit, but also include a Wi-Fi module and a Bluetooth module. The communications modules such as the radio frequency circuit, the Wi-Fi module, and the Bluetooth module may be collectively referred to as a communications interface. Alternatively, the Wi-Fi module may be referred to as a first communications interface, and the Bluetooth module may be referred to as a second communications interface. The processor, the communications interface, the touchscreen, and the memory may be coupled together by using a bus.

An embodiment of this application further provides a computer storage medium. The computer storage medium stores computer program code, and when the foregoing processor executes the computer program code, the device performs related method steps in any one of FIG. 4, FIG. 5, FIG. 6, FIG. 13, FIG. 15, FIG. 16A, FIG. 16B, or FIG. 17, to implement the methods in the foregoing embodiments.

An embodiment of this application further provides a computer program product. When the computer program product is run on a computer, the computer is enabled to perform related method steps in any one of FIG. 4, FIG. 5, FIG. 6. FIG. 13, FIG. 15, FIG. 16A, FIG. 16B, or FIG. 17, to implement the methods in the foregoing embodiments.

The device 2000, the device 2200, the computer storage medium, and the computer program product that are provided in this application each are configured to perform the foregoing corresponding method. Therefore, for beneficial effects that can be achieved by the device 2000, the device 2200, the computer storage medium, and the computer program product, refer to the beneficial effects in the foregoing corresponding method. Details are not described herein again.

The foregoing descriptions about implementations allow a person skilled in the art to understand that, for the purpose of convenient and brief description, division of the foregoing functional modules is taken as an example for description. In an actual application, the foregoing functions can be allocated to different modules and implemented based on a requirement, that is, an inner structure of an apparatus is divided into different functional modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A transmission control method implemented by a first device, wherein the transmission control method comprises:
    communicating first data with a second device through a first communication connection, wherein the first communication connection is a WI-FI connection;
    detecting, when communicating the first data with the second device through the first communication connection, that an error has occurred on the first communication connection;
    sending, to the second device through a second communication connection, error information of the first communication connection indicating that the error has occurred on the first communication connection, wherein the second communication connection is different from the first communication connection;
    exchanging, after sending the error information, a connection parameter of the first communication connection with the second device through the second communication connection; and
    establishing, based on the connection parameter, the first communication connection to the second device.

2. The transmission control method of claim 1, wherein the error information comprises first breakpoint information of the first data indicating an end location at which a part of the first data has been communicated by the first device with the second device before the error occurred, and wherein after sending the error information, the transmission control method further comprises communicating the first data with the second device through the second communication connection based on the first breakpoint information.

3. The transmission control method of claim 2, wherein communicating the first data with the second device further comprises:
    displaying a second screen comprising first confirmation information, wherein the first confirmation information indicates that the error has occurred on the first communication connection, and requests a user to determine to perform a first operation or a second operation, wherein the first operation comprises re-establishing the first communication connection, and communicating the first data through the first communication connection that is re-established, and wherein the second operation comprises communicating the first data through the second communication connection; and
    communicating, in response to a first user selection of the second operation, the first data with the second device through the second communication connection based on the first breakpoint information.

4. The transmission control method of claim 3, further comprising:
    re-establishing, in response to a second user selection of the first operation, the first communication connection to the second device; and
    communicating the first data with the second device through the first communication connection based on the first breakpoint information after re-establishing the first communication connection.

5. The transmission control method of claim 1, wherein after establishing the first communication connection and when communicating with the first data is not completed, the transmission control method further comprises:
    stopping communicating the first data with the second device through the second communication connection; and communicating the first data with the second device through the first communication connection based on second breakpoint information of the first data, wherein the second breakpoint information indicates an end location at which data in the first data has been correctly communicated by the first device with the second device through the second communication connection.

6. The transmission control method of claim 1, wherein before sending the error information, the transmission control method further comprises selecting the second communication connection from a plurality of communication connections in response to detecting the error on the first communication connection, wherein the second communication connection is in the communication connections and either a power consumption is lowest or a transmission rate is highest, and wherein the communication connections comprise all communication connections other than the first communication connection that have been established between the first device and the second device.

7. The transmission control method of claim 6, wherein after selecting the second communication connection and before sending the error information, the transmission control method further comprises providing first prompt information, and wherein the first prompt information indicates that the error has occurred on the first communication connection, and requests a user to determine whether to send the error information to the second device through the second communication connection.

8. The transmission control method of claim 1, wherein before sending the error information, the transmission control method further comprises:
displaying a first screen in response to detecting the error on the first communication connection, wherein the first screen comprises a plurality of options for a plurality of communication connections, and wherein the communication connections comprise all communication connections other than the first communication connection that have been established between the first device and the second device;
receiving, from a user, a selection operation on the options; and
determining, in response to the selection operation, a communication connection corresponding to an option from the user as the second communication connection.

9. The transmission control method of claim 8, wherein the first screen further comprises second prompt information, and wherein the second prompt information indicates that the error has occurred on the first communication connection and instructs the user to select one communication connection from at least two communication connections.

10. A first device comprising:
a first communications interface configured to communicate first data through a first communication connection with a second device;
a processor configured to detect that an error has occurred on the first communication connection when the first communications interface communicates the first data with the second device through the first communication connection; and
a second communications interface configured to:
send error information of the first communication connection to the second device through a second communication connection, wherein the error information indicates that the error has occurred on the first communication connection, and wherein the second communication connection is different from the first communication connection; and
exchange, after sending the error information, a connection parameter of the first communication connection with the second device through the second communication connection,
wherein the processor is further configured to establish, based on the connection parameter, the first communication connection to the second device.

11. The first device of claim 10, wherein the error information comprises first breakpoint information of the first data, wherein the first breakpoint information indicates an end location at which data in the first data has been correctly communicated by the first device with the second device, and wherein the second communications interface is further configured to communicate, based on the first breakpoint information, the first data with the second device through the second communication connection after sending the error information.

12. The first device of claim 11, further comprising a display coupled to the processor and configured to display a second screen comprising first confirmation information, wherein the first confirmation information indicates that the error has occurred on the first communication connection, and requests a user to determine to perform a first operation or a second operation, wherein the first operation comprises re-establishing the first communication connection, and communicating the first data through the first communication connection that is re-established, wherein the second operation comprises communicating the first data through the second communication connection, and wherein the second communications interface is further configured to communicate, in response to a first user selection of the second operation, the first data with the second communication connection based on the first breakpoint information.

13. The first device of claim 10, wherein the processor is further configured to control the second communications interface to stop communicating the first data with the second device through the second communication connection when communicating the first data is not completed, wherein the first communications interface is further configured to communicate the first data through the first communication connection based on second breakpoint information of the first data, and wherein the second breakpoint information indicates an end location at which data in the first data has been correctly communicated by the first device with the second device through the second communication connection.

14. The first device of claim 10, wherein before the second communications interface sends the error information, the processor is further configured to select the second communication connection from a plurality of communication connections in response to detecting the error on the first communication connection, wherein the second communication connection is in the communication connections and either a power consumption is lowest or a transmission rate is highest, and wherein the communication connections comprise all communication connections other than the first communication connection that have been established between the first device and the second device.

15. The first device of claim 14, wherein the processor is further configured to provide first prompt information after selecting the second communication connection from the communication connections and before the second communications interface sends the error information to the second device, and wherein the first prompt information indicates that the error has occurred on the first communication connection, and requests a user to determine whether to send the error information to the second device through the second communication connection.

16. The first device of claim 10, further comprising a display coupled to the processor and configured to display a first screen in response to detecting the error that has occurred on the first communication connection before the second communications interface sends the error information, wherein the first screen comprises a plurality of options for a plurality of communication connections, wherein the communication connections comprise all communication connections other than the first communication connection that have been established between the first device and the second device, and wherein the processor is further configured to:
- receive, from a user, a selection operation on the options; and
- determine, in response to the selection operation, a communication connection corresponding to an option from the user as the second communication connection.

17. The first device of claim 16, wherein the first screen further comprises second prompt information, and wherein the second prompt information indicates that the error has occurred on the first communication connection, and the user to select one communication connection from at least two communication connections.

18. A computer program product comprising computer-executable instructions stored on a non-transitory computer storage medium that, when executed by a processor, cause a first device to:
- communicate first data with a second device through a first communication connection, wherein the first communication connection is a WI-FI connection;
- detect, when communicating the first data with the second device through the first communication connection, that an error has occurred on the first communication connection;
- send error information of the first communication connection indicating that the error has occurred on the first communication connection to the second device through a second communication connection, wherein the second communication connection is different from the first communication connection;
- exchange, after sending the error information, a connection parameter of the first communication connection with second device through the second communication connection; and
- establish, based on the connection parameter, the first communication connection to the second device.

19. The computer program product of claim 18, wherein the error information comprises first breakpoint information of the first data indicating an end location at which a part of the first data has been communicated by the first device with the second device before the error occurred, and wherein after sending the error information, the instructions further cause the first device to communicate the first data with the second device through the second communication connection based on the first breakpoint information.

20. The computer program product of claim 18, wherein after establishing the first communication connection and when communicating with the first data is not completed, the instructions further cause the first device to:
- stop communicating the first data with the second device through the second communication connection; and
- communicate the first data with the second device through the first communication connection based on second breakpoint information of the first data, wherein the second breakpoint information indicates an end location at which data in the first data has been correctly communicated by the first device with the second device through the second communication connection.

* * * * *